United States Patent [19]

Nykiel et al.

[11] Patent Number: 5,812,849

[45] Date of Patent: Sep. 22, 1998

[54] SOFTWARE REDEVELOPMENT SYSTEM

[75] Inventors: Michael A. Nykiel, Shelby Township; Chuck Weingart, Livonia; John R. Oetjens, Rochester, all of Mich.

[73] Assignee: Chrysler Corporation, Auburn Hills, Mich.

[21] Appl. No.: 769,040

[22] Filed: Dec. 18, 1996

[51] Int. Cl.⁶ .................................................. G06F 9/46
[52] U.S. Cl. .................. 395/701; 707/100; 707/102
[58] Field of Search .................. 395/701, 500, 395/703; 707/100, 102; 364/280, 281.3, 282.1, 283.4

[56] References Cited

U.S. PATENT DOCUMENTS

| | | | |
|---|---|---|---|
| 5,448,727 | 9/1995 | Annevelink | 707/101 |
| 5,630,118 | 5/1997 | Shaughnessy | 707/1 |
| 5,668,989 | 9/1997 | Mao | 707/101 |

OTHER PUBLICATIONS

International Business Machines Corporation, The Year 2000 and 2–Digit Dates: A Guide for Planning and IMplemention, Third Edition, 1996.

*Primary Examiner*—Emanuel Todd Voeltz
*Assistant Examiner*—Demetra R. Smith
*Attorney, Agent, or Firm*—Roland A. Fuller, III

[57] ABSTRACT

A predetermined change to a software system having a large number of highly connected and interrelated executables and data files is accomplished using a redevelopment database which is generated from a software library. The redevelopment database maintain resource and relational information on the executables and data files. This information is used by a partitioner which creates groups of executables and data files which have minimal connections to executables and data files outside a given group. The groups are assigned to a resource, with the resource performing the software changes in a given group with the aid of software change mechanisms. After the changes in a group are completed, a configuration management system of the software system receives the newly modified software, updating the software system. The configuration management system also notifies the redevelopment database so that the relational and resource information of the redevelopment database remains up to date, and continues to support the day-to-day modifications other than the predetermined software change.

19 Claims, 27 Drawing Sheets

5,812,849

SOFTWARE REDEVELOPMENT SYSTEM

BACKGROUND OF THE INVENTION

1. Field of the Invention

The preferred embodiment of the present invention is directed to software redevelopment and is more particularly directed to a system and process for conducting large scale changes to highly connected and interrelated software systems.

2. Description of the Related Art

Large software systems have become a critical component in the day-to-day operations of many businesses. These software systems have data structures and executable programs which number in the thousands, hundreds of thousands, or even millions. Each individual program, contained in one of these software systems, has referential dependencies to other files, and likewise each data file has its own set of referential dependencies. This creates an enormous system of interrelated components for which considerable time, effort, expense, and inconvenience is required for incorporation of a change. Furthermore, a significant change can cause interruptions in user accessibility and service, resulting in damaging effects to business operations.

One example is the system glitches caused by the year 2000. During the development of software systems, programs were originally written to think only in 20th-century terms, and to use two digits to store dates. Therefore, the year 2000 would be seen as 1900 by the programs as written, resulting in critical computation errors. These errors create a rolling wave of data processing malfunctions which can quickly overwhelm a computer system, ultimately impairing a company's operations. Therefore, the programs and associated data tables must be expanded to 4 digits.

Currently, there are some software redevelopment tools commercially available. However, a total redevelopment system which offers a complete technical solution and which performs a desired software change in a manner which is transparent to day-to-day business operations, and thereafter continues to provide an integrated component for changes which arise in the future, has not been developed.

Therefore, it is the objective of the present invention to provide a redevelopment system which offers a complete technical solution for conducting large scale changes to highly connected and interrelated software systems, and thereafter continue to provide an integrated component for changes which arise in the future. A systematic approach encompassing the entire change process is required, with the complete solution providing the elements and relationships necessary to define a complete project plan, including a basis for managing the project (i.e. impact analysis, target date variance, and project completeness).

It is a further objective of the present invention to provide a redevelopment system that balances: 1) the need to keep critical systems operational during the change process (i.e. a process which is essentially transparent to the day-to-day operations of a business, 2) maintaining reasonable costs per unit rates, and 3) the ability to complete the task in as timely a fashion as possible, with enhancements outside the redevelopment project experiencing no delays.

SUMMARY OF THE INVENTION

An apparatus and method for implementing a predetermined change in a plurality of software objects throughout a software library is provided. The apparatus consists of a redevelopment database generated from the software library, the redevelopment database having relational information and resource information of the plurality of software objects. A partition is used for creating a plurality of clusters having the plurality of software objects, with the partitioner creating the plurality of clusters based upon the relational information. An assignor is used for allocating each of the plurality of clusters created by the partitioner to a resource, with the assignor allocating each of the plurality of clusters based upon the resource information, ultimately producing a plurality of resource allocated modules. A software change too is used in order to assist in the implementation of the predetermined change in each of the resource allocated modules, producing a changed resource allocated module. Finally, a configuration management system is used to receive the changed resource allocated module once the predetermined change has been completed. The configuration management system updates the software library with the changed resource allocated module, providing implementation of the predetermined change into the software library.

DETAILED DESCRIPTION OF THE PREFERRED EMBODIMENTS

Figure 1:
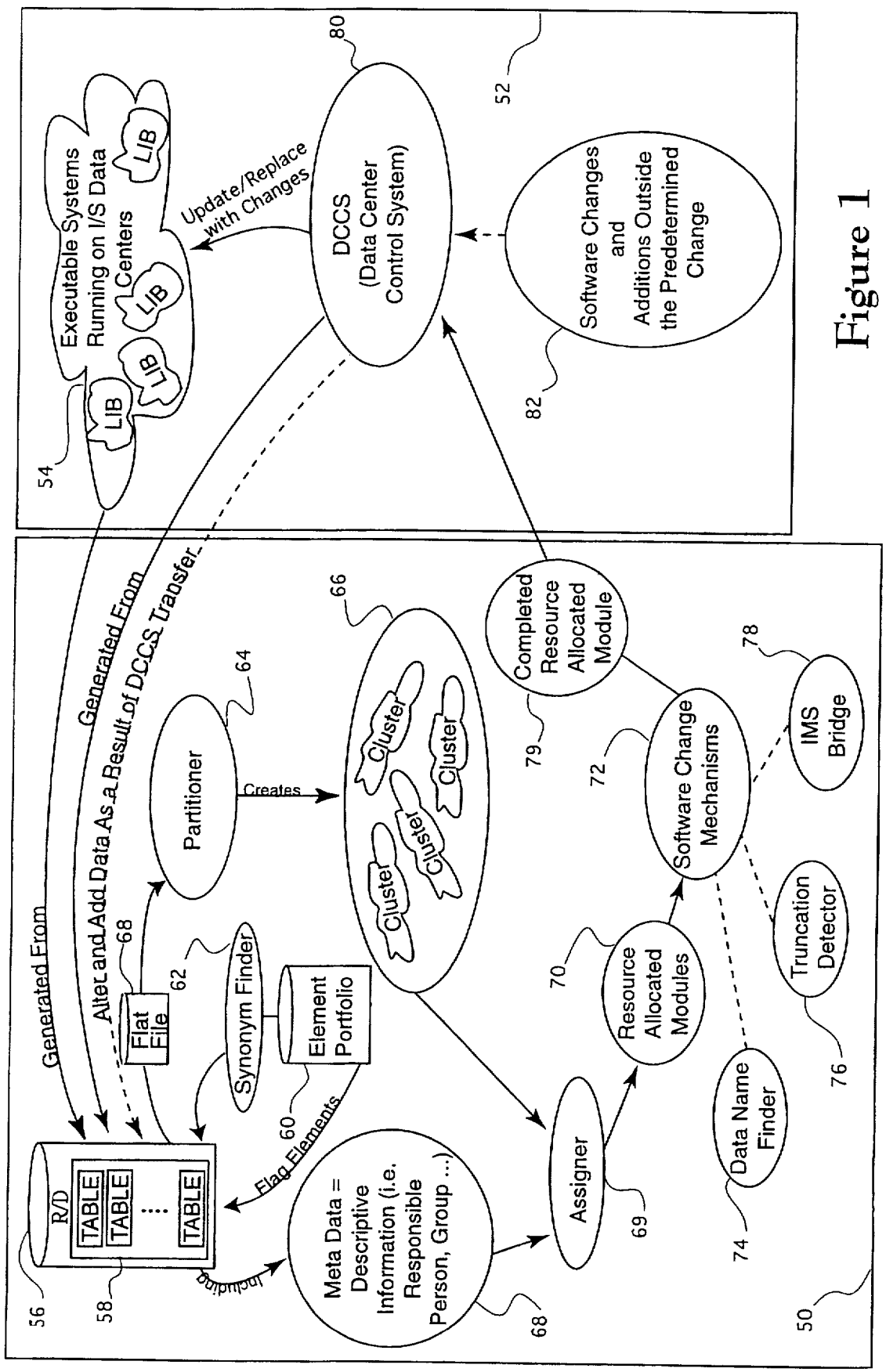
FIG. 1 is a system overview of the redevelopment system of the preferred embodiment of the present invention.

FIG. 1 presents the redevelopment system 50 of the preferred embodiment of the present invention, and a large scale software system 52 utilized in the day-to-day operations of a business. In this detailed description, the large scale software system 52 is a management information system of a large automotive manufacturer, with the software system 52 containing a software library 54 having data and executable programs necessary for continued automobile production and support.

This software system 52 contains a large number of interrelated programs (approximately 100,000), some of which use eight digit part numbers employed throughout the company to uniquely identify all vehicle parts. As the business has grown and expanded, it was determined that it was necessary to expand the part number field size from eight to ten digits. Prior to the present invention, this field expansion, or a similar software change, would involve considerable time, effort, expense, risk, inconvenience, and potential for error. However, with the creation of the redevelopment system 50, this change can now be accomplished in a manner which is transparent to day-to-day business operations, and also reduce the time necessary to complete the system modifications, ultimately reducing costs associated with such a large scale task.

The software library 54 contains the executable software systems running on Information System (I/S) data centers and the associated data of these executable software systems. In the preferred embodiment of the present invention, a redevelopment database 56 is generated from the software library 54. The redevelopment database 56 contains a collection of tables 58 which store and relate information about the executable systems and data of the software library 54. The tables 58 hold information concerning software programs, and data files including, but not limited to Procedure Control Systems (PROCS), Job Control Language (JCL) elements, systems, Data Base 2 (DB2) tables, Information Management System (IMS) databases, Virtual Storage Access Management files (VSAM), sequential files, copylibs, Data Definition (DD) statements, and Data Set Names (DSNs) of the entire software library 54 portfolio.

Due to the immense size of the library 54 and the resulting redevelopment database 56 data pool, it is preferable to generate an element portfolio 60 which contains an information subset of the universe of elements that will potentially require a change (i.e. only that which will require a part number field expansion). This has an exponential effect in reducing complexity, change effort, and most importantly, the time frame for project completion.

The generation of the element portfolio 60 is assisted with a synonym finder 62 which allows the redevelopment database 56 to be queried for data elements that "look like" a given data name or names, or which appear to be synonymous with a name.

The data elements of the element portfolio 60 are flagged in the redevelopment database 56. From these flagged data elements, a flat file 68 is generated which is used by a partitioner 64 to develop an optimal set of work unit partitions or clusters 66. The partitioner 64 essentially takes the executables and data files having the data elements contained in the flat file 68, and divides them into a set of minimally overlapping groups based upon the connections and references of each executable or data file. The partitioner therefore allows changes to one cluster with minimal changes required to other clusters or work units, providing the ability to divide a large and complex task into manageable parts. It also reduces the amount of work necessary to complete the task in that each executable or file is modified a minimum number of times.

The clusters 66 are assigned, using assigner 69, according to resource information 68 contained in the tables 58 of the redevelopment database 56. In the part number field expansion project, the clusters 66 were assigned to a functional group which used the majority of the software or was identified as the "owner" of the majority of software contained in a cluster. The resource allocated modules 70 are then individually modified with an assortment of software change mechanisms 72.

The software change mechanisms 72 which were used to aid in performing the alterations to the resource allocated modules 70 are as follows: a data name finder 74, a truncation detector 76, and IMS bridge 78. The data name finder 74 locates lines of a executable code which require the desired modification. The truncation detector 76 examines compiler output to ensure all fields have been properly modified, and the IMS bridge 78 provides a means by which a software application can store and retrieve data from an IMS database despite the application and database having different formats for the data.

After one of the resource allocated modules 70 has been properly modified with the desired change (i.e. part number fields have been expanded and associated alterations have been performed, and unit and partition subsystem testing has been completed), a completed allocated module 79 is presented to a configuration management system or Data Center Control System (DCCS) 80 of the software system 52. The DCCS 80 then replaces/updates the software library 54 in the same manner as day-to-day changes or additions are incorporated.

It should be noted that concurrent with the predetermined change, which is being implemented by the redevelopment system 50, day-to-day operational changes and additions 82 are being implemented. These changes and additions 82, and the changes requested by the redevelopment system 50, result in an update of the redevelopment database 56. This is accomplished by directly linking the redevelopment database 56 to the DCCS 80. This integration allows the redevelopment database 56 to remain current with the changes and additions 82 and the predetermined changes incorporated to date (i.e. the completed part number field expansion changes).

Figure 2:
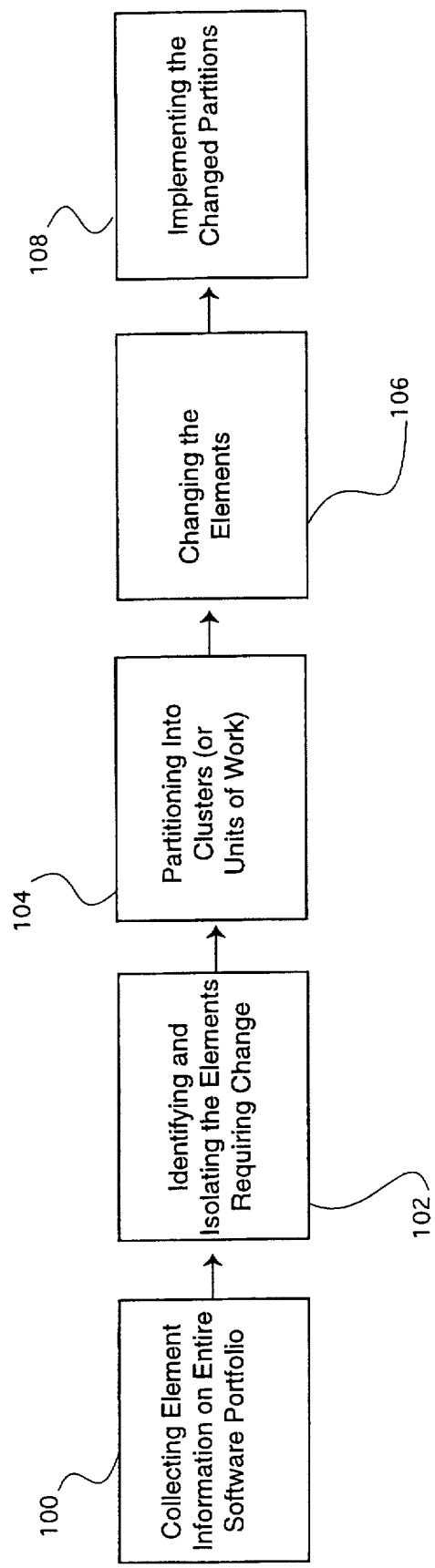
FIG. 2 is a high level flow chart of the functional flow of the preferred embodiment of the present invention.

FIG. 2 presents a high level flowchart of the functional flow of the preferred embodiment of the present invention. This change methodology for a highly connected and interrelated software system can be broken down into five basic steps: 1) collecting element information on the entire software portfolio 100, 2) identifying and isolating the elements requiring change 102, 3) partitioning into clusters 104, 4) changing the elements 106, and 5) implementing each partition 108. It is important to remember that this process is being performed concurrently with the day-to-day business operations, however the changes implemented by this process are conducted in such a manner as they are transparent to these day-to-day operations.

The step of collecting element information on the entire software portfolio 102 was implemented utilizing as a baseline a commercially available software package developed by the IBM Corporation that was enhanced to meet the requirements of this invention. An explanation of this software package can be found in IBM Redevelopment Directory, Version 3, Release 1, Modification 0. The redevelopment directory software package provides multiple database tables which store and relate information about the executable systems and the corresponding data.

Figure 3:
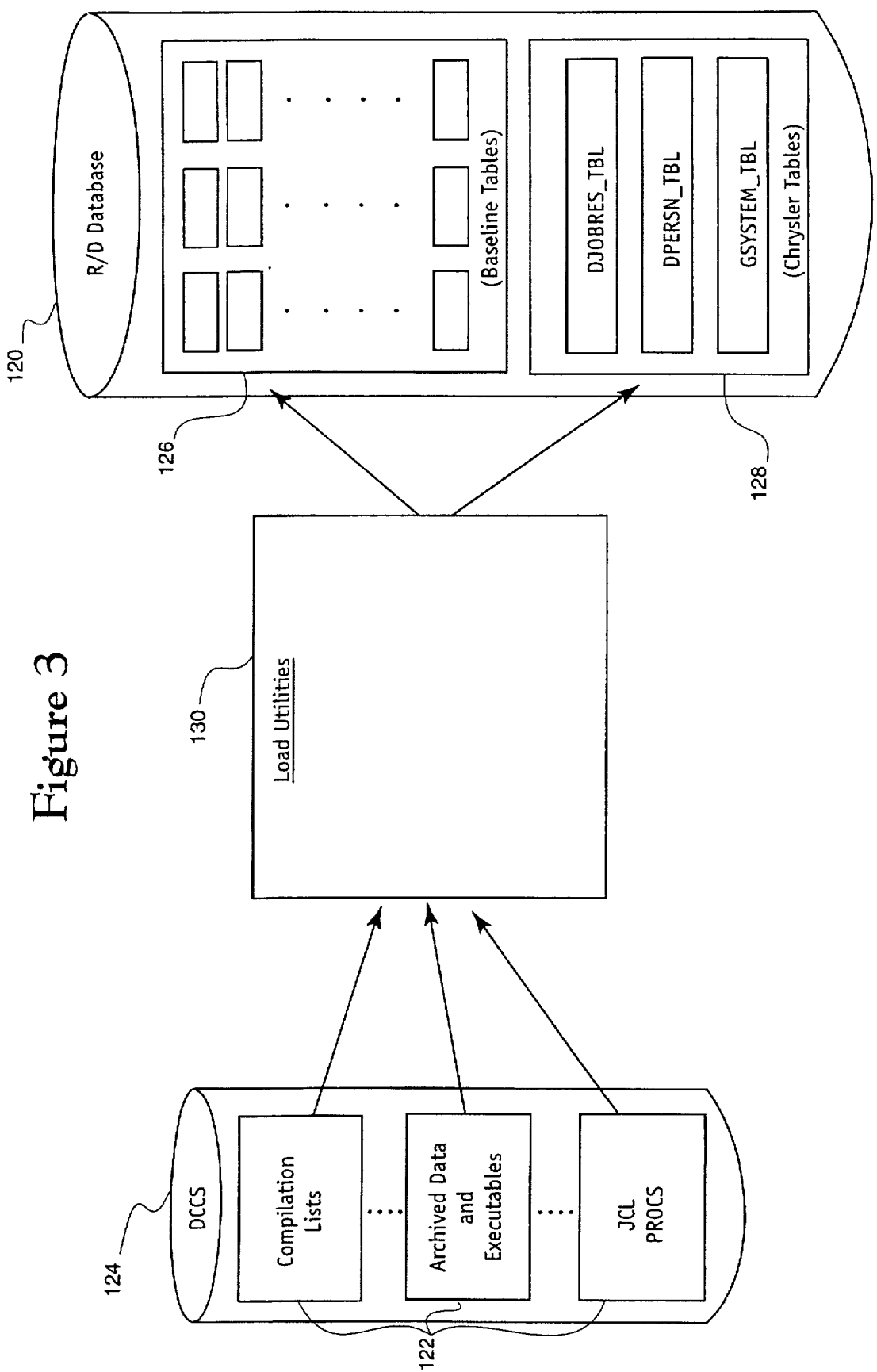
FIG. 3 is a system overview for loading of the redevelopment database of the preferred embodiment of the present invention.

As shown in FIG. 3, the redevelopment database 120 must be loaded with the specific system information 122 contained in the DCCS 124. The DCCS information is placed into the baseline tables 126 and user created tables 128 of the redevelopment database 120. The index report for the baseline tables 126 is provided in Appendix 1, and the user created data tables 128 are provided in Appendix 2. The two tables (126, 128) are loaded using standard IBM supplied load utilities 130.

Figure 4:
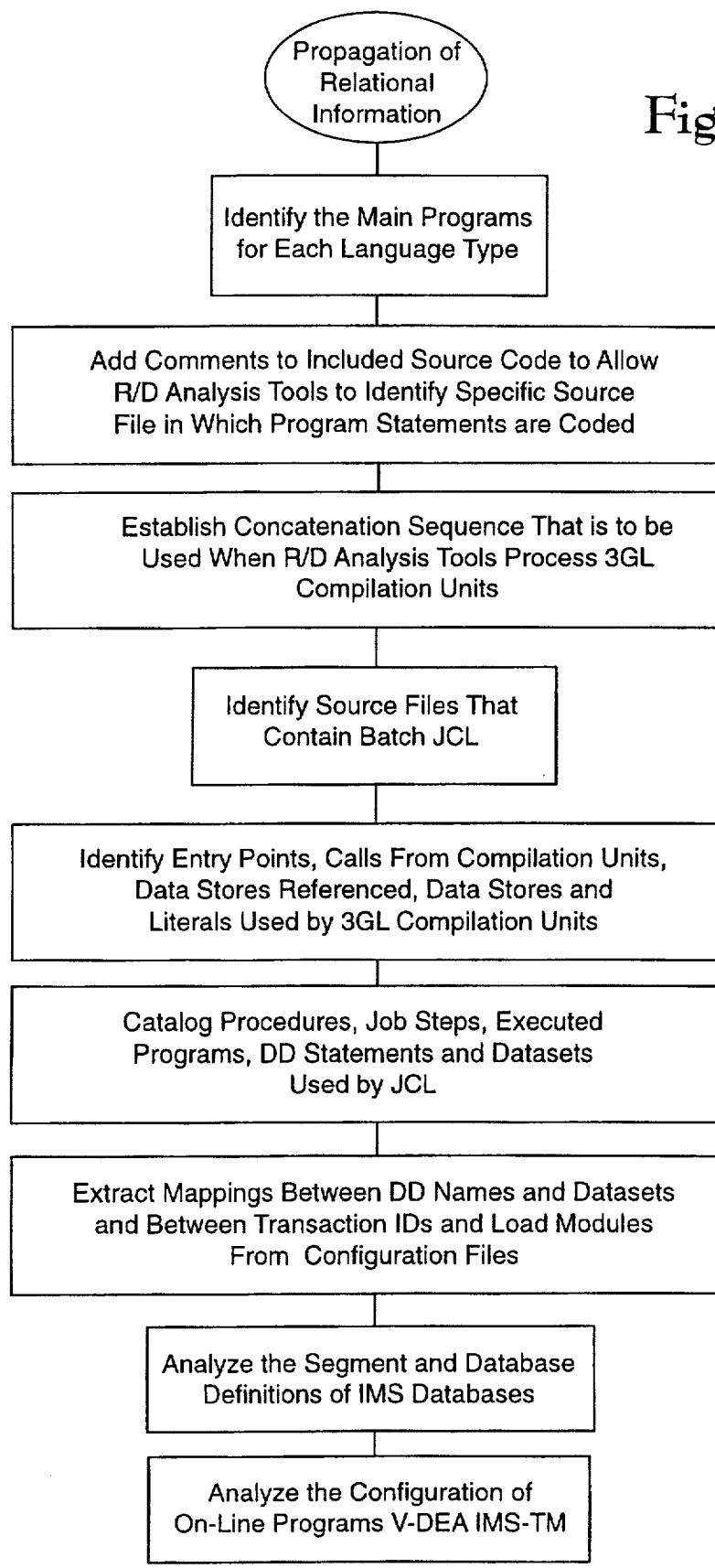
FIG. 4 is an illustration of some of the basic tasks associated with the propagation of relational information.

Once the redevelopment database has been loaded with the required information, analysis tools of the redevelopment software package are utilized to propagate relational information which will be subsequently used in the partitioning, assignment, and executable and data modifications. This propagation of relational information is performed using automated analysis tools of the redevelopment directory software package. FIG. 4 presents some of the basic tasks associated with the propagation of the relational information.

In general, the redevelopment directory contains information about elements (program and data file variables) and how these elements are referentially related. The overall design is such that a query can be entered at any point in the Redevelopment Directory on a specific element, and the relationships can be identified to the higher and/or lower levels as needed. For example, if the entry point is a program name, the lower level queries would identify the names of any called modules or compile included members. The higher level queries would include the names of what procedure(s) the program is executed in, which jobs call the procedure, and the name of the personnel/group responsible for the job.

Although entity relationships were included in the baseline IBM software package, additional relationships were added to the present invention. The relationships were added in order to provide the ability to fully identify change impacts. The relationships added are as follows:

SITE/SCHEDULE

The Site/Schedule relationship established a production job execution schedule for a given site. The site was identified as a production host operating system. This allowed queries to determine if a change was made to a specific element, what site would be affected.

SCHEDULE/JOB

The Schedule/Job relationship established the production schedule for a given job. This information could be used to take job names that were to be changed and identify the affected production schedules. A review of these schedules would assist in determining the most opportune time to implement a job change.

JOB/PROC

The Job/Proc relationship established which procedures where used by a given production job. This information could be used to identify which jobs must be taken off line when a procedure was to be changed. In addition, after a procedure was identified, the job names could be used to query which production job schedules were affected.

PROC/FILE

The Proc/File relationship provided identification of files accessed in a procedure. This information could be used to identify which procedures were affected with a specific file change. In this way, changes to a file characteristic (i.e. file length) that required a change to the procedure that defined the file could be quickly identified and subsequently used to locate procedures affected and requiring modifications.

PROC/PROGRAM

The Proc/Program relationship was used to build the relational information between procedures and programs. The relationships were used to identify which procedures were affected when a given program name was changed. This provided a means by which affected procedures could be used to identify jobs and thereby allow identification of affects to production schedules.

PROGRAM/FILE

The Program/File relationship identifies which file is used by a program. This established which of the programs must be considered when a given file is changed or which of the files are affected when a program is changed.

PROGRAM/COPYBOOK

The Program/Copybook relationship established a link between programs and copybooks. In this way, identification of affects due to copybook changes could be accomplished.

PROGRAM/SCREEN

The Program/Screen relationship identified links between programs and on-line screen definitions. This provided a quick means to locate screen displays which would be affected by a program or field change. This also provided assistance in identifying screens which would need to be taken off line while changes were being incorporated, allowing notification to those who used the display.

DB2 TABLE/DB2

The DB2 Table/DB2 relationship established which of the DB2 views were referenced by a DB2 table. This information provided identification of the potential DB2 view requiring changes.

PROGRAM/DB2

The Program/DB2 relationship established which DB2 views were referenced by a program. These were utilized to identify the DB2 view which would require changes if modifications to a program were made.

COPYBOOK/FIELD ELEMENTS

The Copybook/Field elements relationship allowed queries than could be executed based on a field name, and a copybook using this field name could be located. This assisted in identifying which of the copybooks required changing when a field was identified as needing to be modified.

Following the propagation of relational information, the components of the system are mapped. Mapping codes are provided to each of the components of the system which will serve as a starting point during the partitioning, and will also be used to relate components to the responsible group which is to perform the modifications. Furthermore, call statements and other control transfers found in compilation units are mapped to the specific source compilation units that receive a call.

Figure 5:
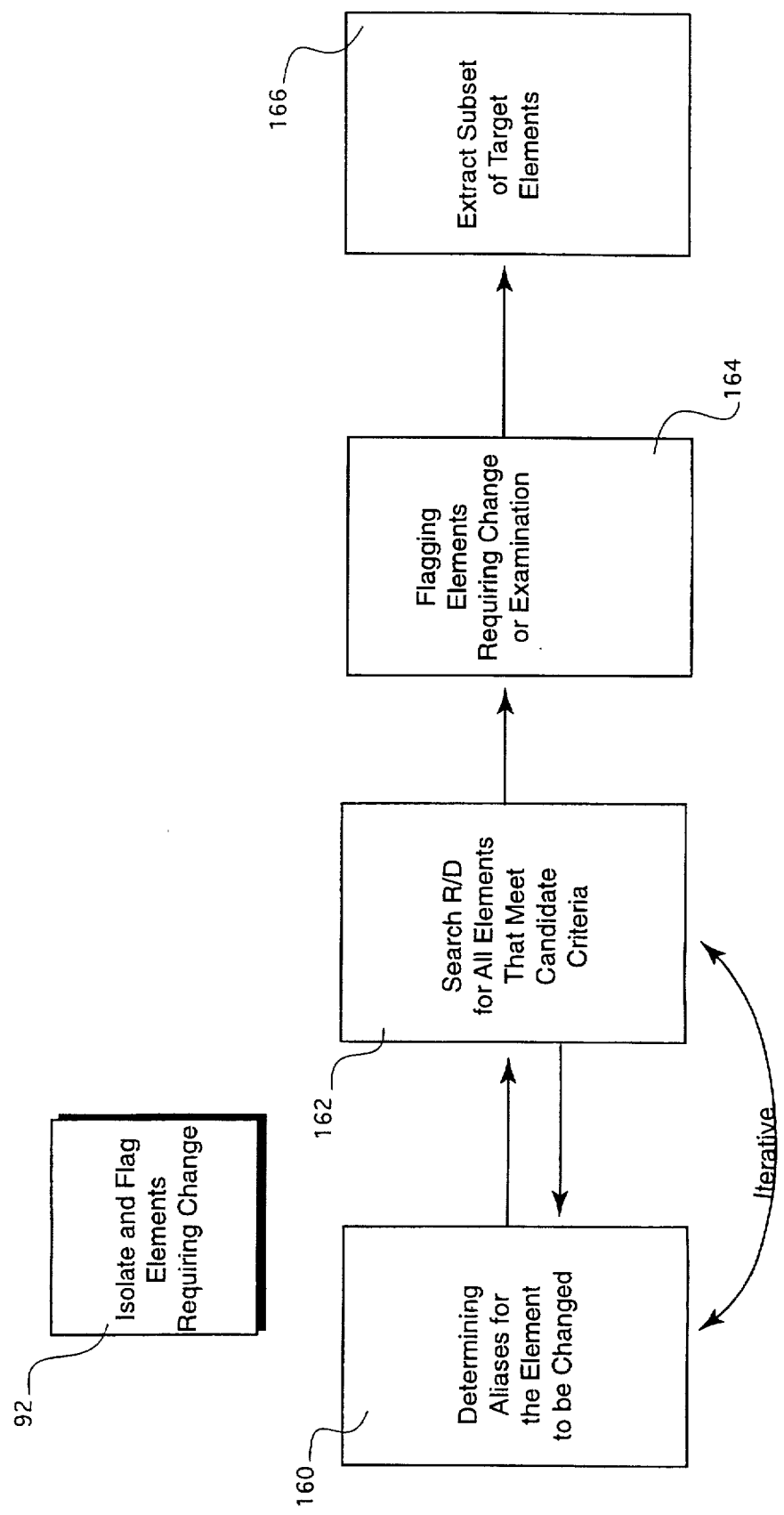
FIG. 5 is a flowchart of the functional flow associated with the identification and isolation of the elements requiring change of the preferred embodiment of the present invention.

As previously indicated in FIG. 2, once the entire software portfolio (the universal portfolio) has been created 100, the elements requiring change are identified and isolated 102. As shown in FIG. 5, the process steps associated with identification and isolation of the elements requiring change 92 consists of four substeps: 1) determining aliases for the element to be changed 160, i.e. candidate sub-fields and aliases for part number, 2) searching the redevelopment database for all elements that meet the candidate criteria 162, 3) flagging the elements requiring change or examination 166, and 4) extracting the elements that meet the specified criteria 164.

The step of determining aliases for the element to be changed 160 and the step of searching the redevelopment database for all elements that meet the candidate criteria 162, are iterative. These two steps are conducted using the synonym finder 180, the system overview of which is shown in FIG. 6.

Figure 6:
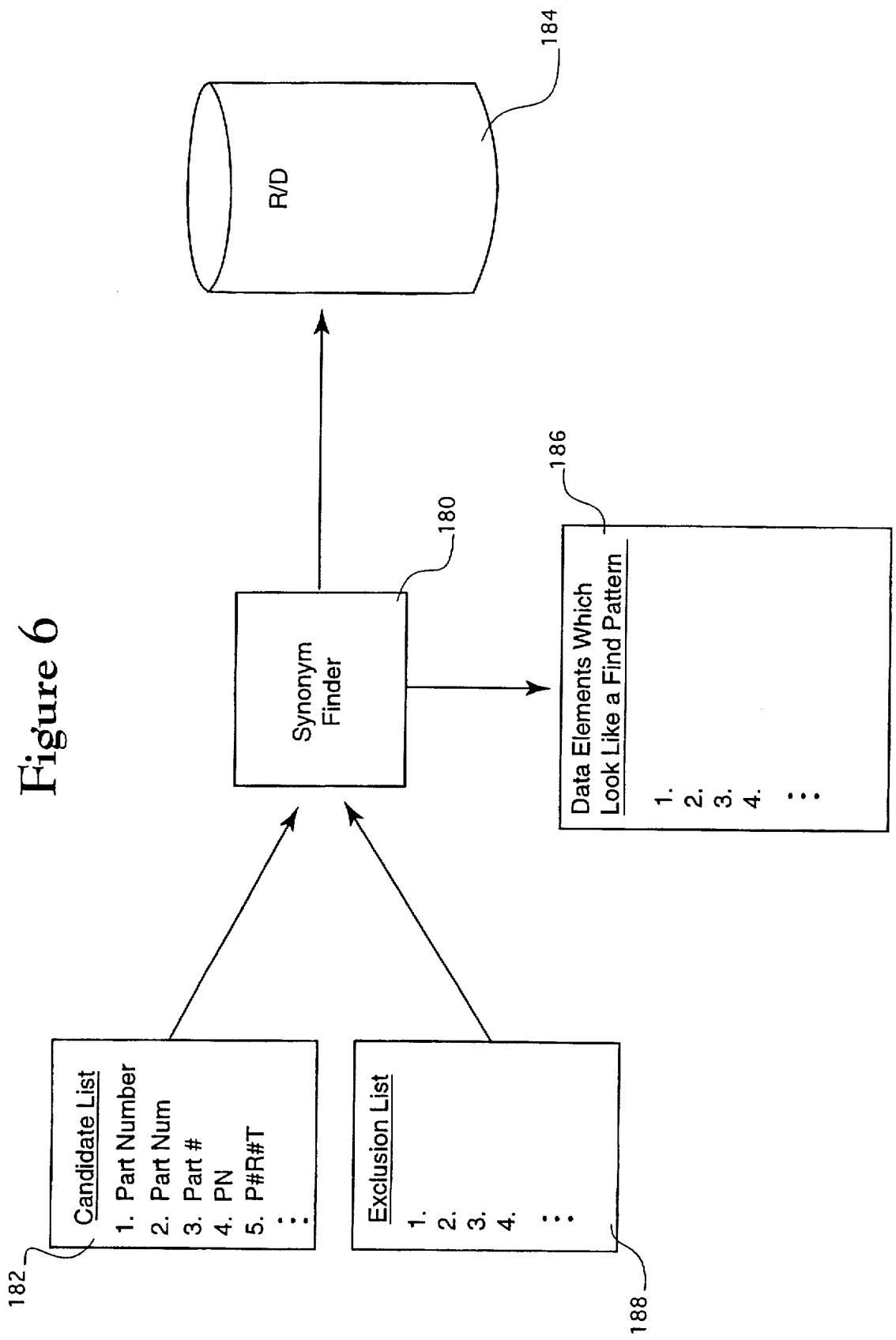
FIG. 6 is an system overview of the synonym finder of the preferred embodiment of the present invention.

Referring to FIG. 6, a candidate list 182 is developed based upon user knowledge of the system. The candidate list 182 also includes wild cards. This candidate list is provided as input to the synonym finder 180 which searches the redevelopment database 184 and generates an output of data elements 186 which are synonymous with the elements contained in the candidate list 182. The output of data elements 186 is reviewed, and elements which are known not to be a synonym for the desired change (i.e. part number in this description) are placed in the exclusion list 188. For example, identification of an element belonging to a banking system or a human resource system would not have a part number, therefore an element which was identified and belonged to one of these groups would be placed in the exclusion list 188. The exclusion list 188, which is also provided as input to the synonym finder 180, prohibits these elements from being identified as a synonym element.

Figure 7:
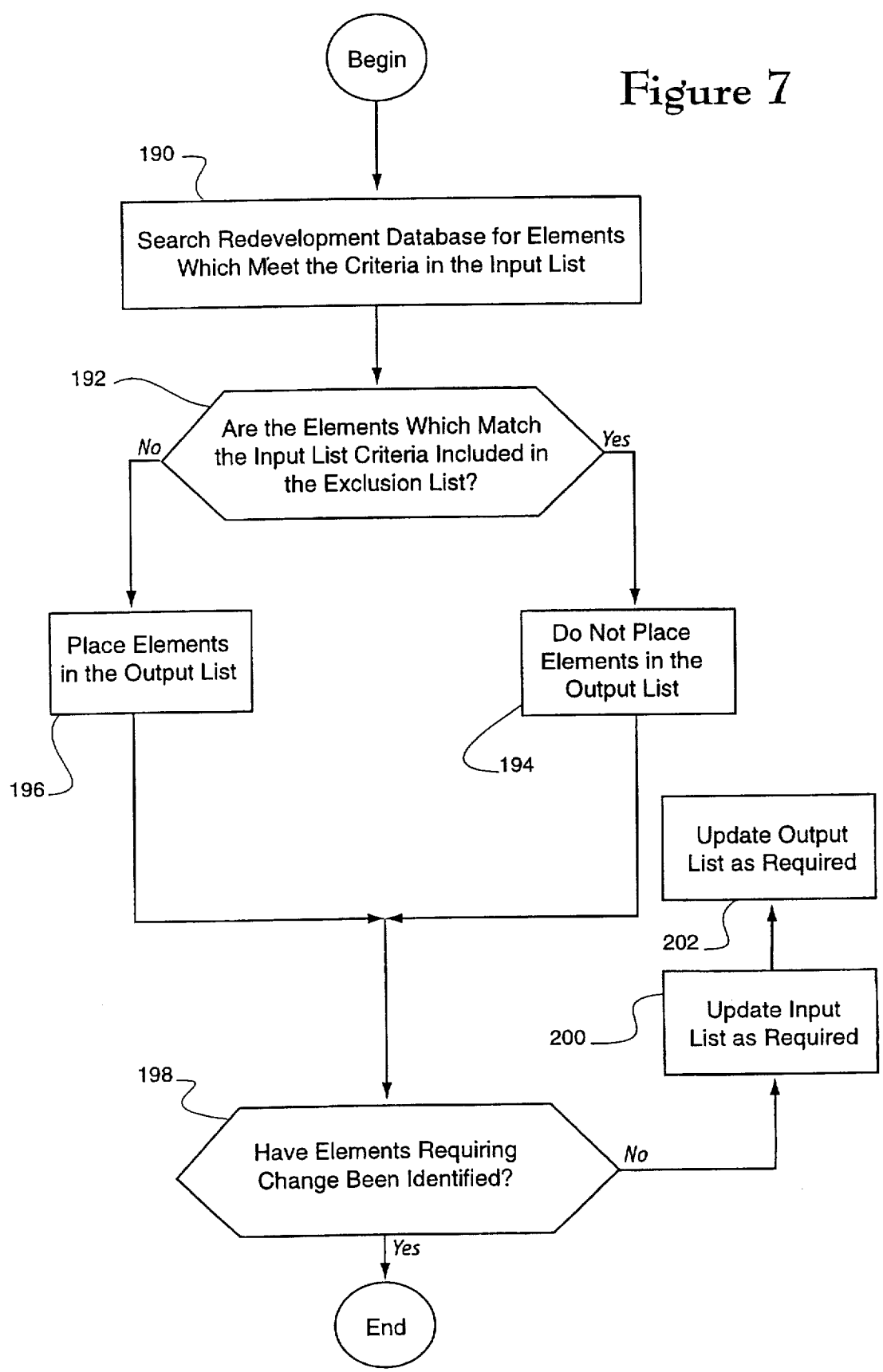
FIG. 7 is a flowchart of the functional flow of the synonym finder of the preferred embodiment of the present invention.

FIG. 7 shows a flowchart containing the functional flow of the synonym finder. Initially, the redevelopment database is searched for elements which meet the criteria of the input list 190. The elements which match the input list criteria are then compared to the exclusion list 192. The elements which are contained in the exclusion list are not placed in the output file 194, while those elements which are not contained in the exclusion list are placed in the output file 196.

The output file is then examined to determine if the elements requiring change have been identified 198. This examination includes reviewing programs having objects identified by the synonym finder to determine if an object requiring change is present (i.e. presence of part number fields). If the identified program does not contain a part number, the input list is examined to determine why the program was selected as an executable having a part number. Adjustments are then made to the input list to correct the over inclusion 200 or an entry is made in the exclusion list 202, and the process is repeated. For example, suppose P#R#T is in the input list, with # used as a wild card. The synonym finder is run and finds a program with the variable name PRINT, which is not a part number. Therefore, PRINT can be added to the exclusion list, or the form of the P#R#T inquiry in the input list can be changed. Once the elements requiring change have been identified, the process is complete 204.

Referring to FIG. 5, once the aliases for the element to be changed have been determined 160, and the redevelopment database has been searched for all elements that meet the candidate criteria 162, the change element portfolio is generated from the redevelopment database with the elements which meet the specified criteria of the synonym finder. The elements and relationships identified by the synonym finder are flagged as part number related 166 and are extracted 164 using programs which access the redevelopment database using Structured Query Language (SQL) statements. The element portfolio contains executable program name, data file names, referential information for each of these executable programs and data files, and resource information.

Figure 8:
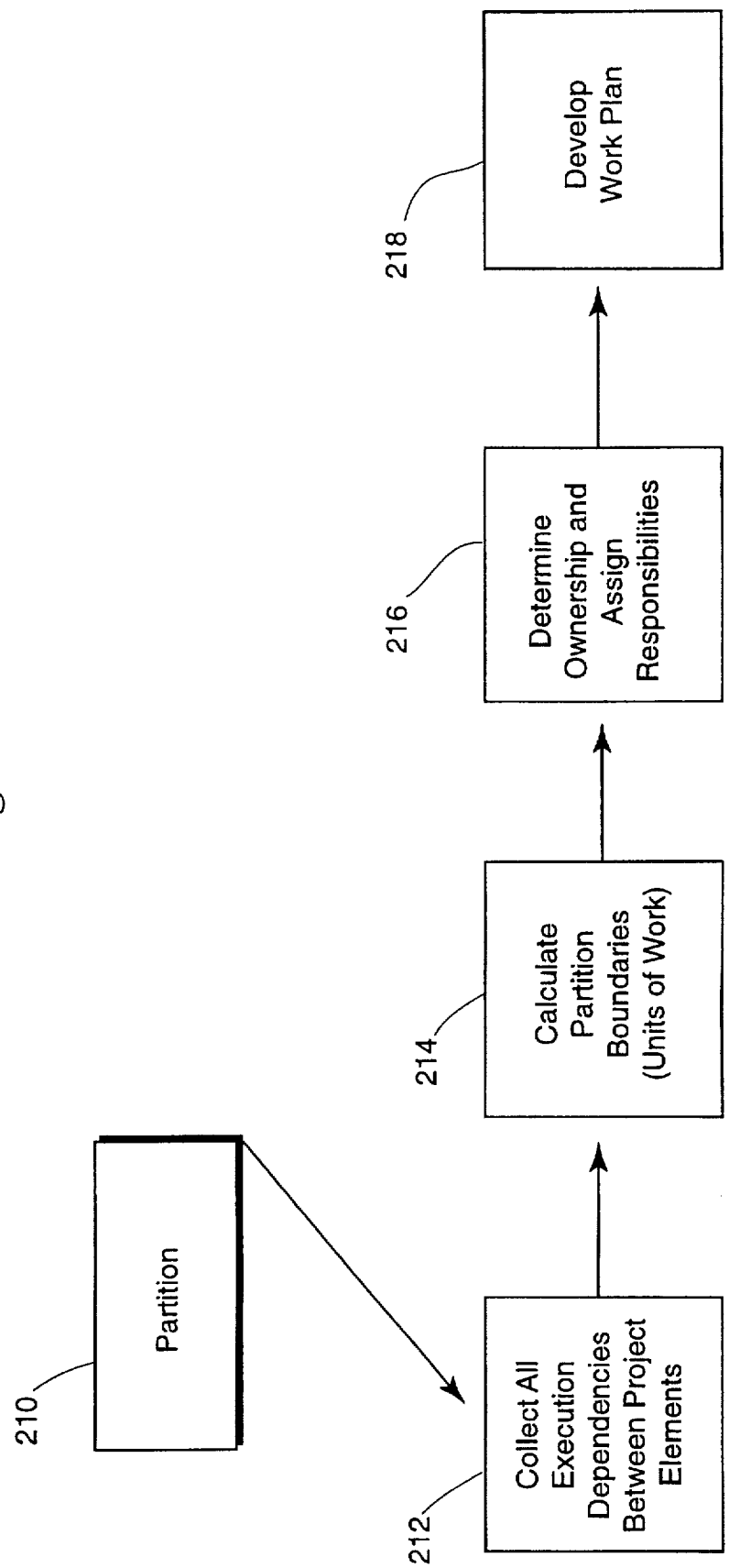
FIG. 8 is a flowchart of the functional flow associated with the partitioning of the preferred embodiment of the present invention.

Once the elements requiring change have been identified and isolated, the partitioning into clusters or units of work is commenced. As shown in FIG. 8, this partitioning 210 can be broken into four substeps: 1) collecting all executed interdependencies between project elements 212, 2) calculating partition boundaries 214, 3) determining ownership and assigning the responsibilities 216, and 4) developing a work plan 218.

The step of collecting all executed interdependencies between project elements involves generating flat files that contain file and program referential information and resource information. These flat files were extracted from the redevelopment database using SQL inquiries. These SQL inquiries create four files which are then used by the partitioner to calculate partition boundaries (i.e., units of work).

Figure 9:
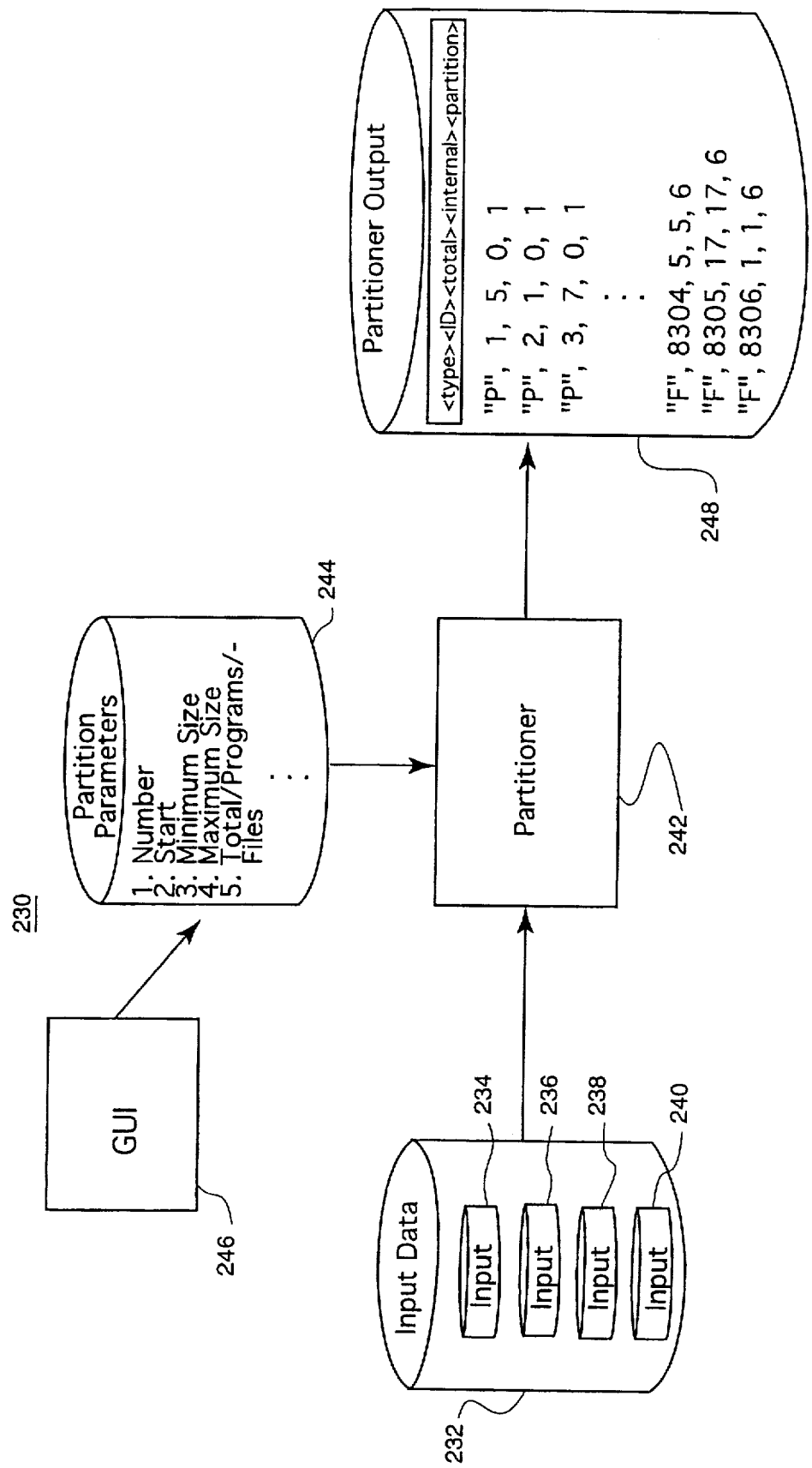
FIG. 9 is a system overview of the partitioning system used in the preferred embodiment of the present invention.

The partitioning system 230 is shown in FIG. 9. The partitioning system 230 is comprised of: input data 232 consisting of four input files (234, 236, 238, 240), and the partitioner 242, which receives user provided input parameters 244 obtained through a graphical user interface 246 (GUI), and produces an output list 248 of optimally clustered executables and files.

Figure 10:
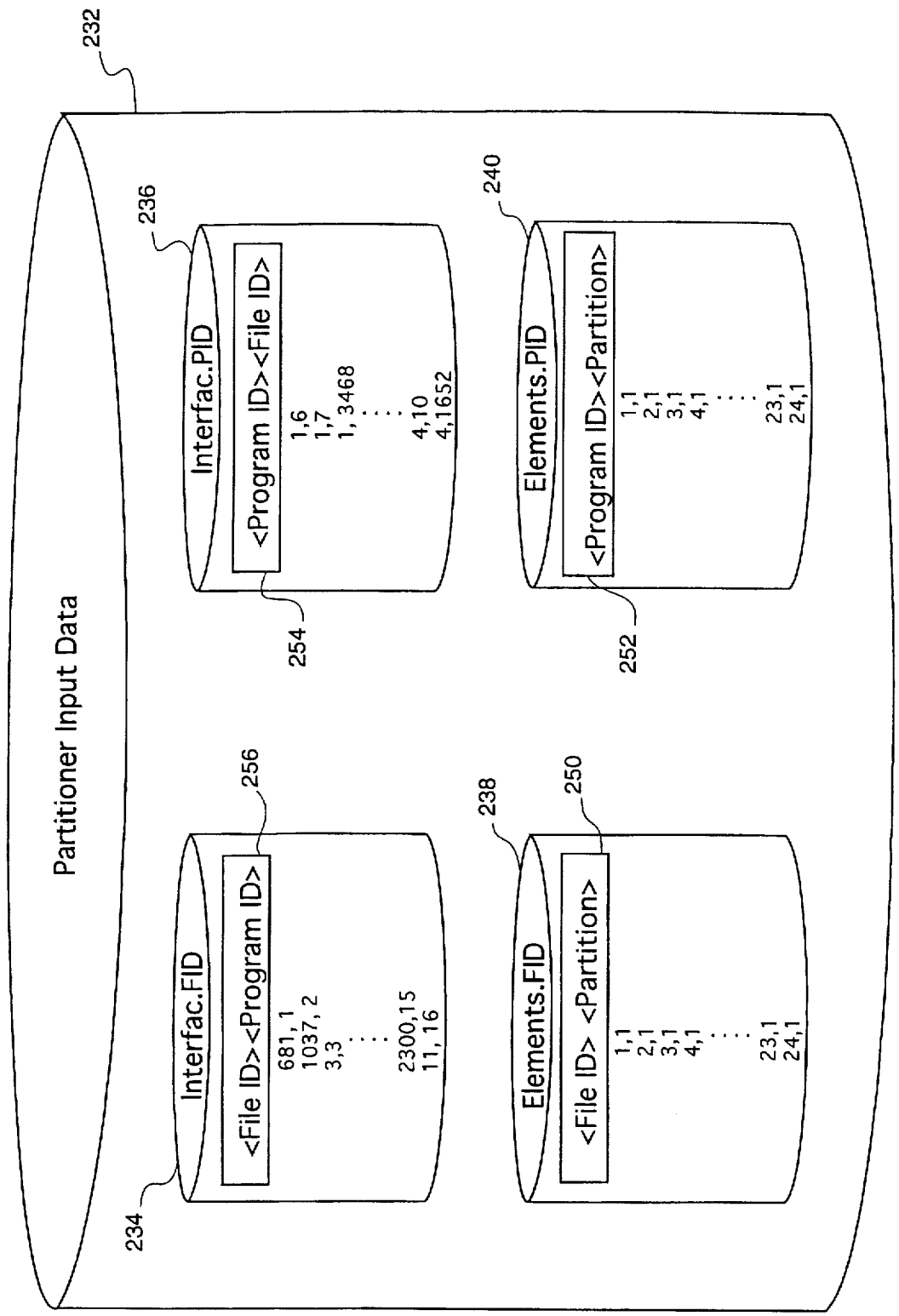
FIG. 10 is an illustration of the four input files used by the partitioning system of the preferred embodiment of the present invention.

Referring to FIG. 10, the first input 240 to the partitioner 242 is the ELEMENTS.PID file which is a list of Program Identifications and the partition, if any, to which the program has currently been assigned. It should be noted that if a program does not currently belong to a partition, a partition value of "−1" is used to indicate the un-associated status. The second input file 238 is the ELEMENTS.PID file which provides the same information as the ELEMENTS.PID file except that it is a list of File identifications and the partition, if any, to which the file has currently been assigned. The data format (250, 252) of these two files (238, 240) which were used are also shown in FIG. 10.

The third input 236 and fourth input 234 to the partitioner 242 are the Program to File interfaces contained in the INTERFAC.PID file and INTERFAC.FID file. These two files list each program a file has references to, and each file a program has references to, respectively. The data format (254, 256) of these two files (236, 234) which were used are also shown in FIG. 10.

Figure 11:
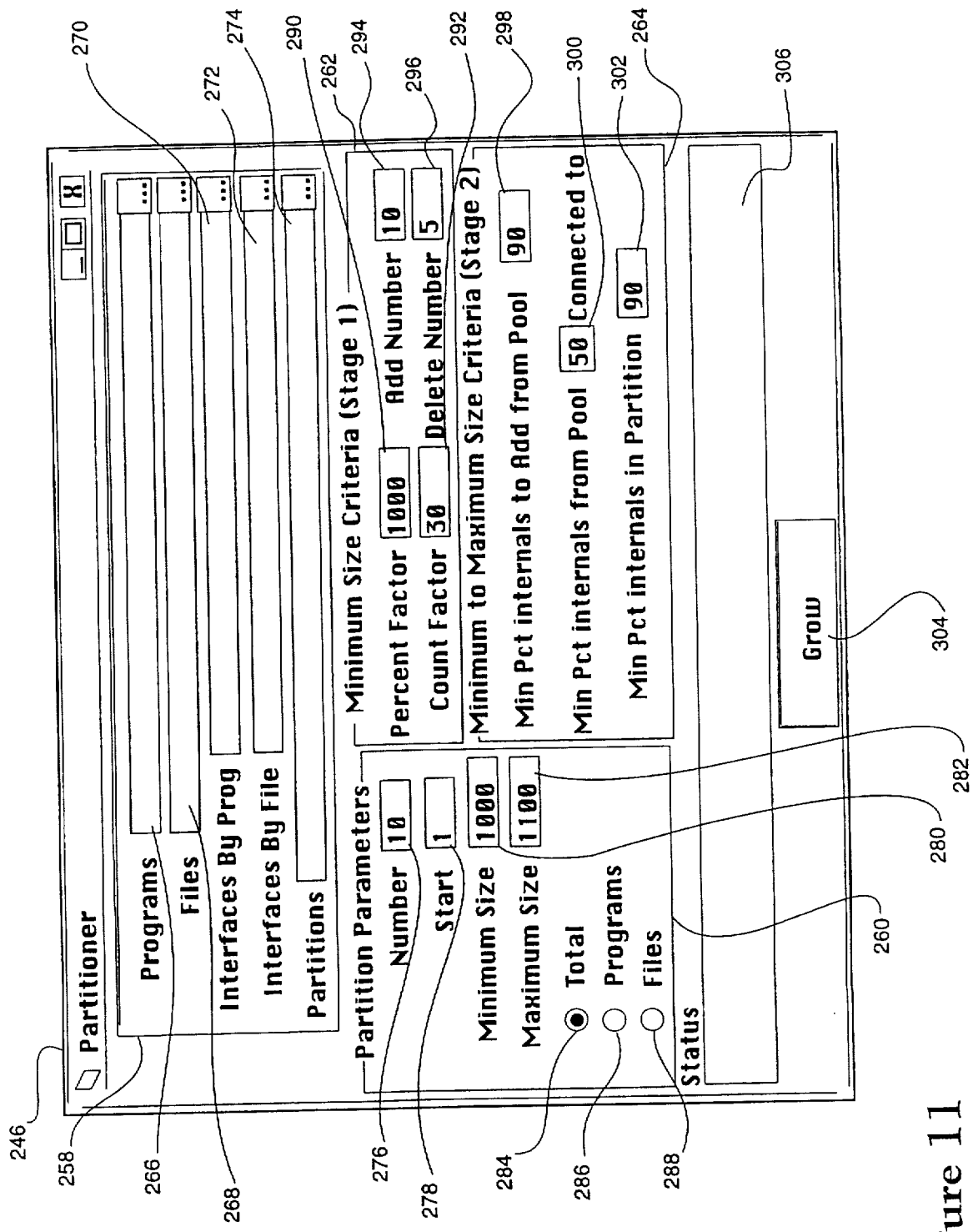
FIG. 11 is an illustration of the graphical user interface of the partitioning system used by the preferred embodiment of the present invention.

The last set of inputs used by the partitioner 242 are provided by the user through the GUI 246, which was implemented using Microsoft's Visual Basic. As shown in FIG. 11, the GUI 246 has four input groups: input/output identification 258, partition parameters 260, minimum size criteria 262, and minimum to maximum size criteria 264.

The input/output identification 258 allows the user to enter the name of the four input files to be used by the partitioner. This includes Programs 266, which is the input file containing the Program names and partitions (if assigned), Files 268, which is the input file containing the Names and partitions (if assigned), Interfaces By Prog 270, which is the name of the file containing the Program/File connections ordered by Program name, and Interfaces By File 272, which is the name of the file containing the Program/File connections ordered by File name. Furthermore, the partitioner generated file which contains a list of the Programs and Files with the assigned partitions, may be designated by the user with Partitions 274.

The partition parameters group 260 provides the user with the ability to set Number 276, which is the number of partitions which are to generated, Start 278, which is the partition number from which to begin growing a partition, Minimum Size 280, which is the minimum number of objects to be contained in a single partition, and Maximum Size 282, which is the maximum number of objects to be contained in a single partition. The partition parameters group 260 also provides three buttons, Total 284, Programs 286, and Files 288, which allow the user to indicate if partition size is to be calculated based upon the number of both programs and files, the number of programs only, or the number of files only.

The Minimum Size group 262 allows the user to specify parameters used in the first stage of partitioning, which is to be subsequently described. The Percent Factor 290 and Count Factor 292 provide a means of expressing a tradeoff between the number of connections and the percentage of its total connections an object has in partitions. A high Percent Factor 290 and low Count Factor 292 will result in objects with a low number of connection being favored, while a low Percent Factor 290 and high Count Factor 292 will result in objects with a high number of connections being favored.

The Add Number 294 and Delete Number 296 allow the user to dictate the number of objects to be added in each cycle used to grow a minimum size partition of the first stage, and the number of objects to be deleted during the same first stage cycle. The difference between the Add Number 294 and Delete Number 296 controls the incremental increase of the partition during each stage 1 cycle. The magnitude of the Add Number 294 and Delete Number 296 controls the amount of "look ahead" the partitioning system performs in growing the partition. As an example, values of 10/5 versus 100/95 for Add Number 294/Delete Number 296 gives the same incremental increase of 5. The latter value performs a search which is increased by a magnitude, potentially providing a better solution. However, this potentially better solution comes with a higher computational cost.

The three user selected parameters of the Minimum to Maximum Size Criteria group 264, provides user control of the second stage of the partitioning, subsequently discussed. The Minimum Percentage to add from Pool 298 sets the threshold for the minimum percentage of connections an object must have after stage 1 has been completed in order to be included in the partition being generated. The higher the threshold, the lower the number of objects that will be added to the partition. A lower threshold is given for Minimum Percent Internal From Pool 300. Objects with a percentage of its connections in a partition will be added only if it is connected to an object already in the partition that has Minimum Percentage Internal in Partition 154 of its connections in the pool. This allows the user to "finish off" highly connected objects already in the partition by bringing in their remaining connections. The higher the thresholds, the lesser number of objects that will be added tao the partition.

Once the necessary information has been provided, the partitioner can begin to optimally cluster the pool of data center executables and files. The user initiates partition generation with the Grow button 304, and the Status Window 306 displays the current partition, partition size, and the stage of the partitioning system during execution.

Figure 12:
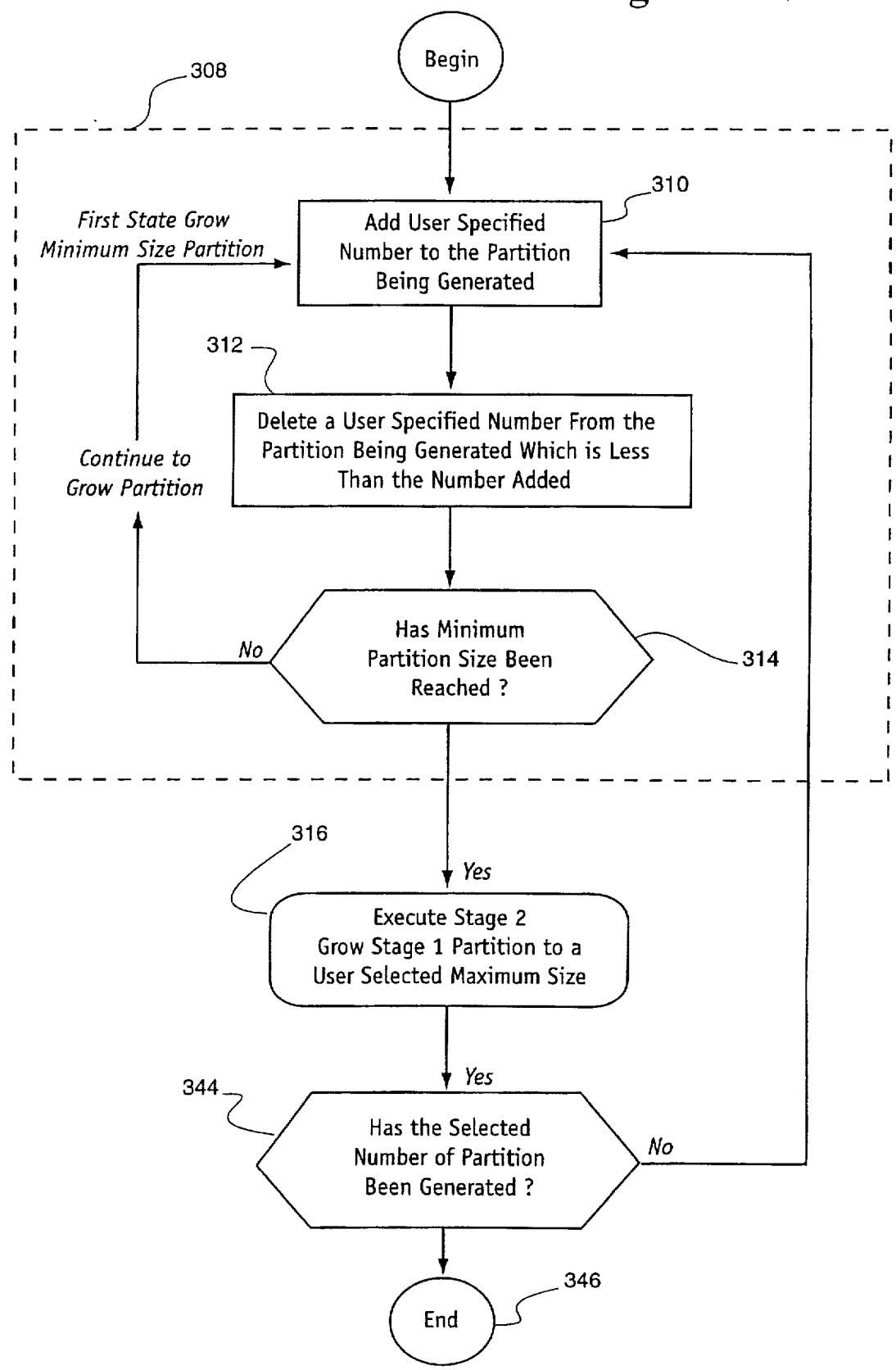
FIG. 12 is a flowchart depicting the functional flow of the two stage partitioning process performed by the partitioning system used by the preferred embodiment of the present invention.

The partitioner utilizes a two stage approach which is presented in FIG. 12. The application which implemented these two steps was developed using Microsoft's visual basic. The first stage 308 entails growing a partition to a minimum size. This is done in an iterative manner by adding a user specified number of objects (Add Number 294 of FIG. 11) from the pool, to the partition currently being generated 310. After the specified number is added, a user specified number of objects (Delete Number 296 of FIG. 11), which is less than the number of objects added, is deleted from the partition and returned to the pool 312. The objects added or deleted during this stage are selected based upon a calculated "score" to be subsequently described.

Because the number to be added is greater than the number to be deleted, each iteration results in a net increase in the partition size. After each addition and deletion, the partition size is measured 314 (based upon user entered Minimum Size 132 of FIG. 11) and once the minimum size is reached, the second stage 316 is commenced.

Figure 13:
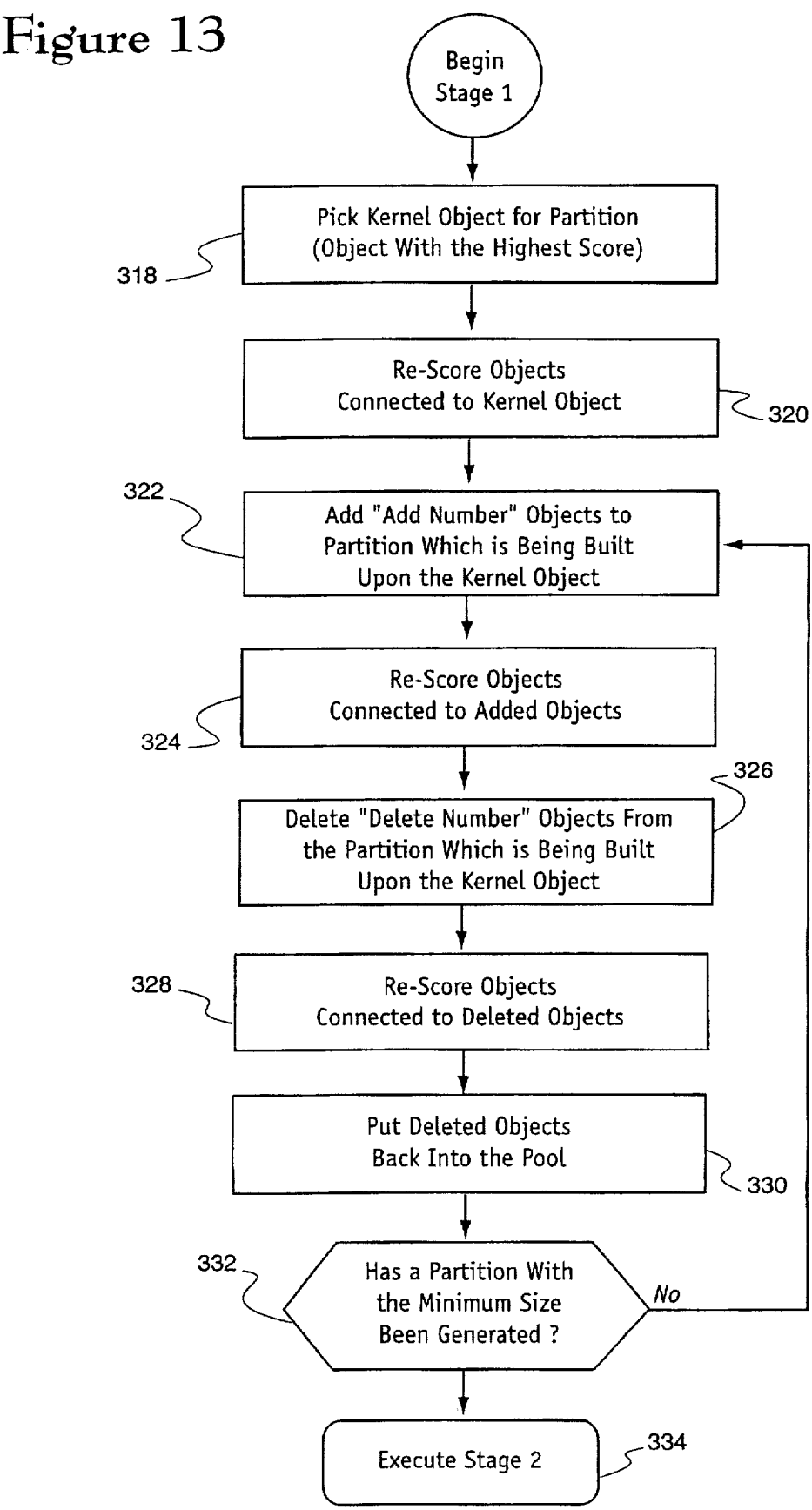
FIG. 13 is a flowchart depicting the functional flow of the first stage of the partitioning process which is performed by the partitioning system used by the preferred embodiment of the present invention.

FIG. 13 provides additional details of the functional flow of the first stage of the partitioning process. Initially, a program or file is selected as the kernel object upon which to grow a partition 318. This initial selection is based upon a Score, which is calculated using equation (2). The Score has $$\text{Score} = C * (\# \text{ of connections in a partition}) + P * ( (\# \text{ of connections in a partition}) / (\# \text{ of connections})) \quad (2)$$

two components. The first component weighs the importance of the number of connections that the object has in a partition, and the second component normalizes the score with the fraction of the number of connections in a partition in relation to the objects total number of connections of the object.

In the event that there are multiple programs or files with the highest Score, the program or file with the greatest number of connections is selected as the kernel object. In addition, if no partitions have been created, all programs and files will have a score of zero, therefore the program or file with the greatest number of connections will be used as the kernel.

Once the kernel object has been chosen, the score for all objects, which are connected to the kernel object (i.e. having a reference to or from the kernel object) are re-Scored 320 using equation (2). The user specified number of objects with the highest score are then added to the current partition being generated 322, and the Score for each object connected to an added object is recalculated using equation (2) 324. After this is accomplished, a user specified number of objects are deleted from the partition 326. The objects deleted are those with the lowest score. The objects connected to the deleted objects are then re-scored using equation (2) 328, and the deleted objects are then returned to the general pool 330.

After this has been accomplished, the partition size is measured to determine if the minimum size for a partition has been reached 332. If the minimum size has not been reached, the first stage process is repeated, starting with the addition of the specified number of objects with the highest score 322. If the minimum partition size has been reached, stage two is initiated 334.

Figure 14:
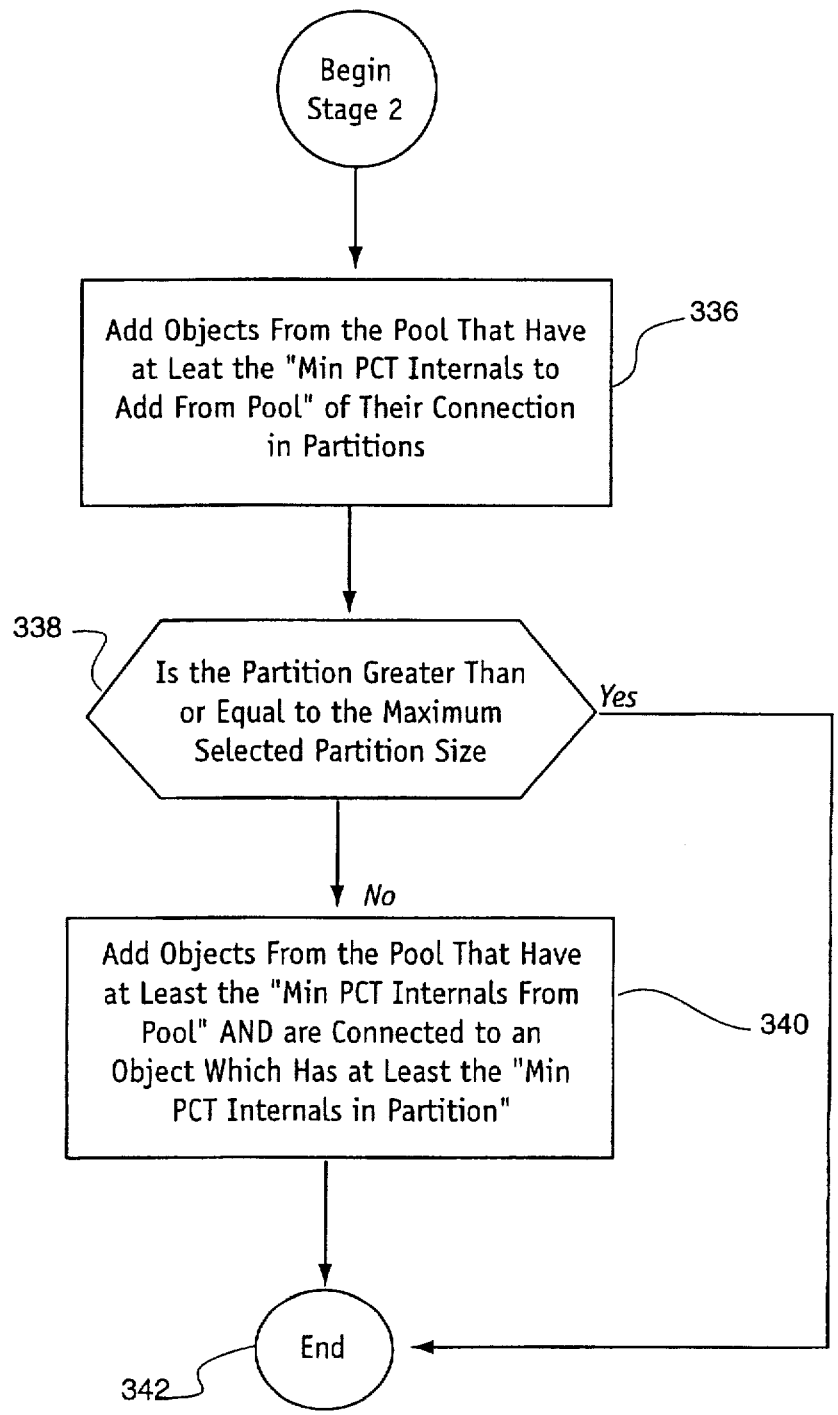
FIG. 14 is a flowchart depicting the functional flow of the second stage of the partitioning process which is performed by the partitioning system used by the preferred embodiment of the present invention.

Referring to FIG. 14, the second stage of the partitioning entails growing the partition of the first stage until a maximum partition size is reached. This is done by attempting to add all objects having a percentage of their connections in a stage 1 partition or a certain fraction threshold of their connections to the stage 1 generated partition 336, as it is referred (set by the user selection of Min Pct Internals to Add from Pool 298 of FIG. 11). If this results in a partition which is greater than or equal to the maximum desired size of a partition 338 (set by Maximum Size 282 of FIG. 11), the second stage is complete 342. If the maximum size of the partition is not reached, and all objects with a certain fraction threshold of their connections are included in the first stage partition, objects that have at least a certain lower minimum percentage threshold of their connections in partitions are added to the partition under development if connected to an object that has at least a certain higher minimum percentage of their connections in a partition already created 340. (Note that the certain lower minimum percentage is specified by the user in Min Pct Internals from Pool 300, and the certain higher minimum percentage is specified by Connected to Min Pct Internals in Partition 302, both of FIG. 11) Once this has been accomplished, the second stage is complete 342.

Referring to FIG. 12, after the second stage is complete, the determination is made as to whether the user selected number of partitions has been generated with the addition of the partition created during the current iteration 344. If the correct number of partitions has been generated, the partitioning is complete, and the application ends 208. If more partitions are required, stage 1 is re-initiated, beginning with the addition of a user specified number of objects to the new partition being generated 310.

Figure 15:
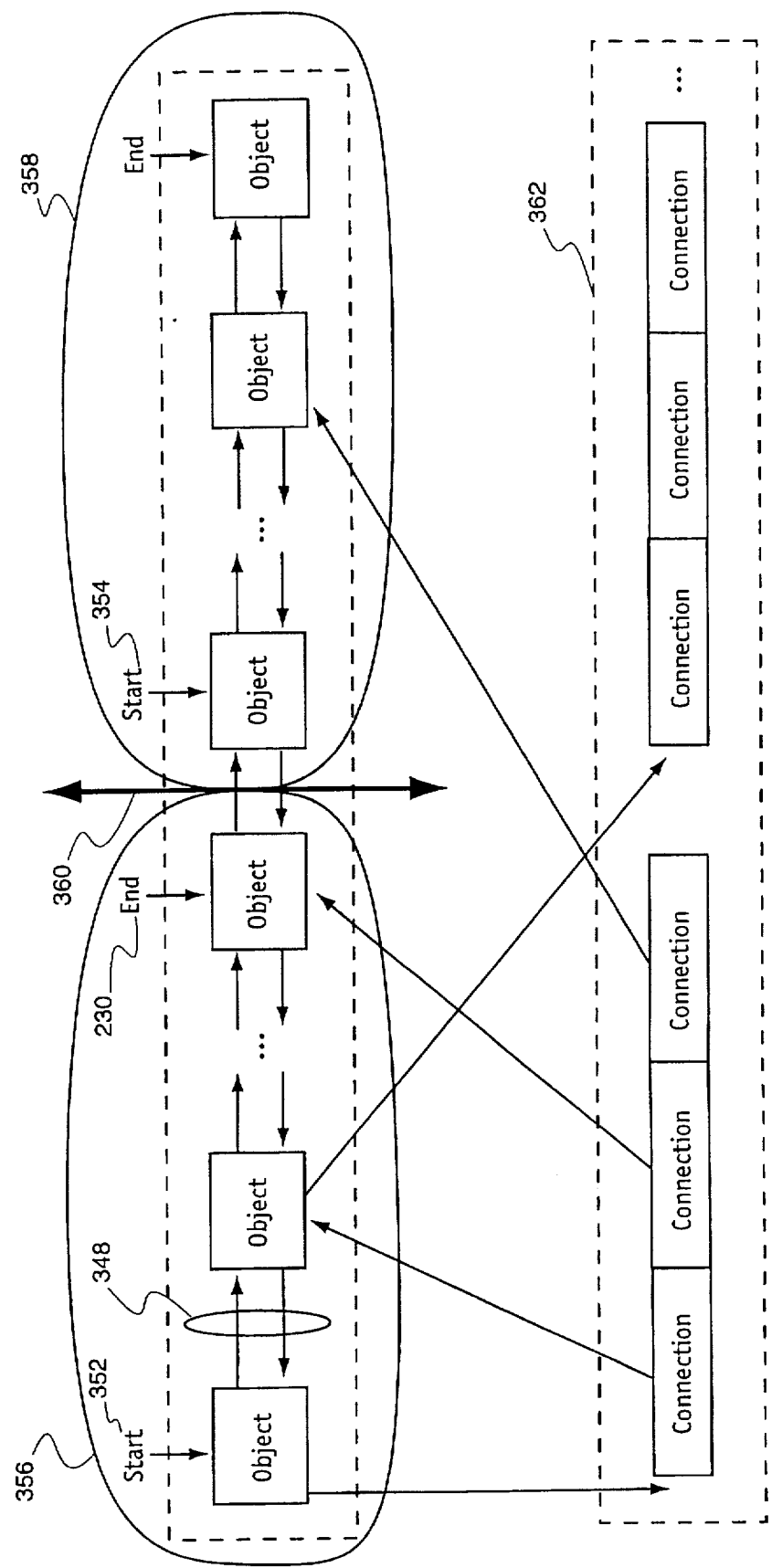
FIG. 15 is an illustration of the logical design for implementation of the Partitioner application used by the preferred embodiment of the present invention.

FIG. 15 presents the logical design for implementing the partitioner application. The design is centered around a double linked 348 list of objects that are to be partitioned 350. The list objects 350 is ordered based upon the score of the objects, as calculated using equation (2). The higher the score, the closer an object is to the start position (352, 354) of the partition 356 and pool 358. Furthermore, by maintaining the start position (354) of the pool 358 and end position of the partition 356, the boundary 360 between the partition 356 and pool 358 is created.

An array of connections 362 is defined for each object. Each object has an array of pointers to all other objects that are referenced by the object. In this way, as an object is added or deleted from the partition, the array of connections 362 can be used to directly update the scores of the connected objects. Furthermore, an object with an updated score can be easily moved up or down the collection through the use of the double linked list, with most objects moved in small incremental steps, thereby minimizing the cost of a linear search in order to reorder the object in the double linked list.

The following partition object data type was defined in Visual Basic 3.0.

```
Type Partition Object
    Next As Long
    Previous As Long
    Total As Integer
    Internal As Integer
    ScoreFactor As Integer
    Score As Long
    Partition As Integer
    Connection As Long
End Type
```

This allows an array of partitions to be created, with indexes in the Partition Object array used as pointers. The "Next" and "Previous" fields are pointers that provide the double linked list capability. "Total" is the total number of connections of an object, with the number of connections that an object has contained in a partition, specified by "Internal." The "ScoreFactor" based on the user provided parameters is maintained, along with the current "Score" of the object. The current partition to which an object is assigned is stored, and "Connection" provides an index into the Connection array that points to the set of references of an object.

A limitation of Visual Basic 3.0 is that a single dimension in an array limited to 32K. This limitation places the requirement to have a multi-dimensional array when a data object, having a 32K size, may exist. The partition objects array of the preferred embodiment supports nearly 100,000 Partition objects. In addition, a subroutine can be defined ('pntrListConvert') that converts the 'long' index into two 'integer' indexes for the two dimension array using integer division and modulus functions. The declaration used are as follows:

```
ReDim   PartitionObjectsArray(0 to 2, 0 to 32766) as
PartitionObject
    Global ConnectionsArray(0 to 9, 0 to 30000) as Long
    Sub pntrListConvert (anID As Long, anID1 As Integer, AnID2 as
Integer)
```

For illustrative purposes, Appendix 3 presents an example of how an object (referred in the source code as an element) is moved through an array using the "Next" and "Previous" pointers. Movement forward in the List is based on the score of the object. The higher the score, the closer to the front of the list an object will be located. The "Previous" pointers of the objects in the list are used to find the correct position for the given object. Once found, the affected object pointers are updated. Conversion to the two dimension array is also shown in the illustrative example of appendix 3.

Once the partition boundary or work units have been calculated, the responsibility for each cluster or work unit is assigned to a responsible group. This was accomplished by importing the partitioner output, including associated resource information into an Access Database program. Using the database, partitions were assigned to a particular information system group or person. This assignment was based upon the number of programs and data files "owned" by a person or group in a partition. The group with ownership of the majority of data files and executables within a work unit was given the task to change the cluster. It should be noted that this assignment can be based upon a wide variety of resource information.

Once the partitioning and assignments are completed, the elements contained within the partitioned clusters are changed by the responsible group.

Figure 16:
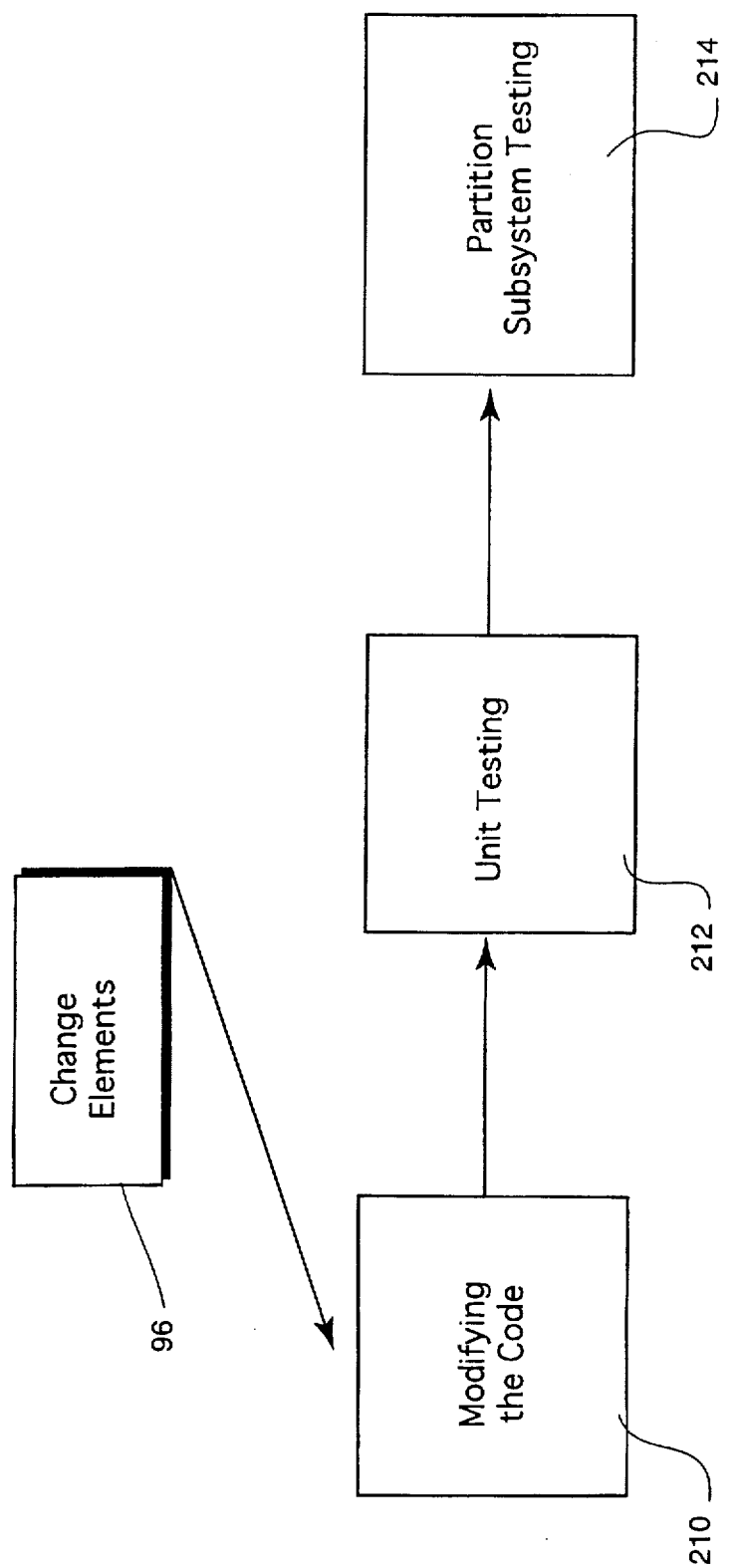
FIG. 16 is a flowchart of the process associated with the changing of elements of the preferred embodiment of the present invention.

As shown in FIG. 16, changing the elements 96 consists of modifying the code 210, unit testing 212, and partition subsystem testing 214. In order to assist individuals in modifying the code 210, a data name finder was utilized to identify the locations of the elements requiring a change.

Figure 17:
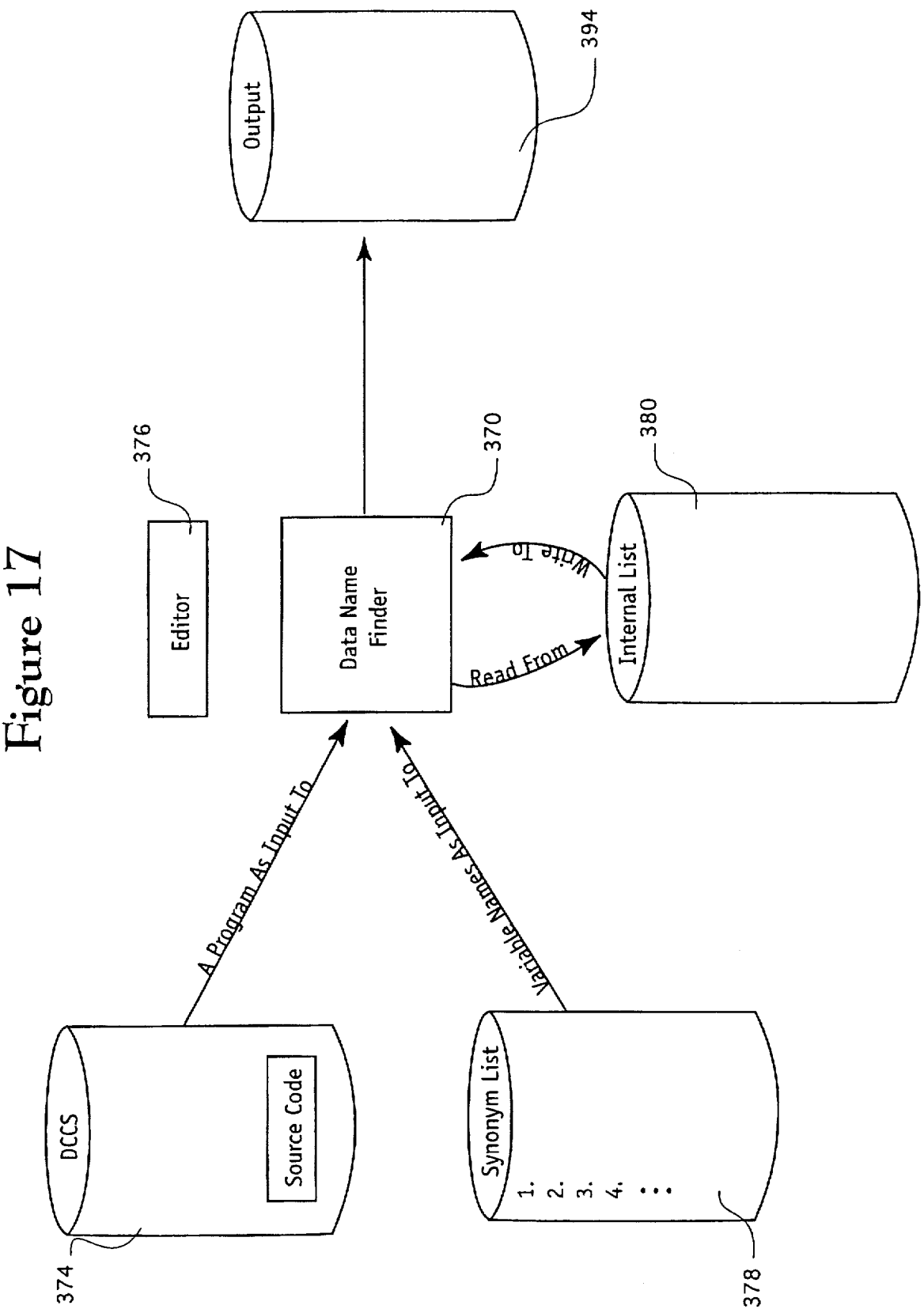
FIG. 17 is a system overview of the data name finder used by the preferred embodiment of the present invention.

FIG. 17 illustrate a system overview of the data name finder. The data name finder 370 uses the program source code 372 contained in the DCCS 374 as an input. This tool is used with an editor 376 to search a program for variable names contained n the synonym list 378 generated by the synonym finder, or variables which receive a variable name, collated in the internal synonym during data name finder execution.

Figure 18:
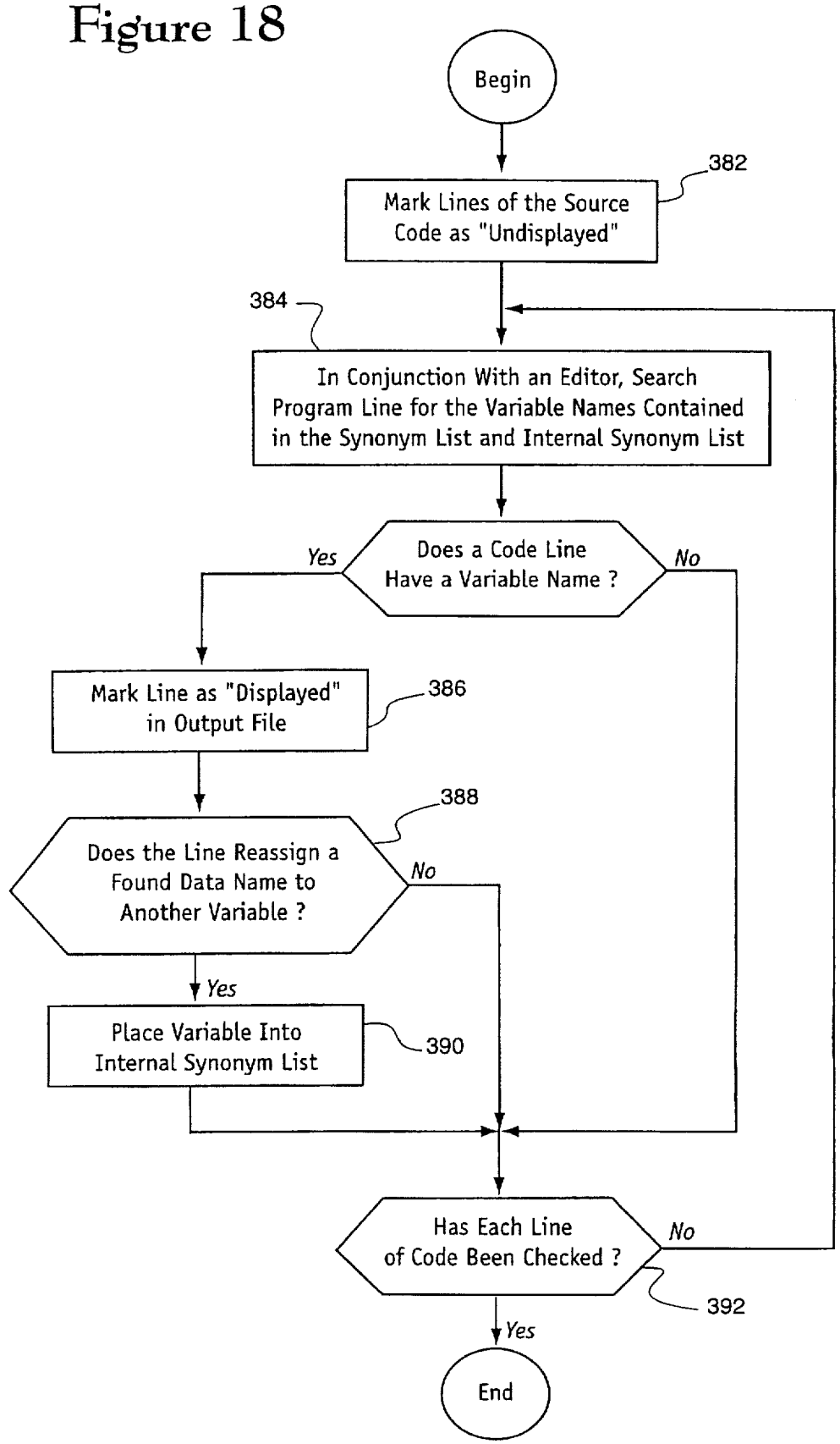
FIG. 18 is a flowchart of the functional flow of the data name finder used by the preferred embodiment of the present invention.

FIG. 18 shows the functional flow of the data name finder. Initially, all lines of the source code are marked as "undisplayed 382." In conjunction with an editor, each program line is searched for variable names contained in the synonym list and internal synonym list 384. When a line that contains a match to synonym finder item is located, the line is marked as "displayed" 386. Furthermore, each line is searched for a variable reassignment 388. If a line reassigns a found data name to another variable, the other variable is added to an internal synonym list 390. In this way, internal working variables of an element are also identified as potentially requiring change. For example, if part number in a program uses the content of a variable WORKING-STORAGE-MISC, lines with this variable will be marked as "displayed" so that an individual performing the changes to a program will investigate the potential need to change this variable due to the part number change. The process is repeated until each line of code is checked 392, Ultimately an output which lists all variables are marked as "displayed" and their location (i.e. line numbers) in the program is produced (see FIG. 17, data name finder output 394).

Figure 19:
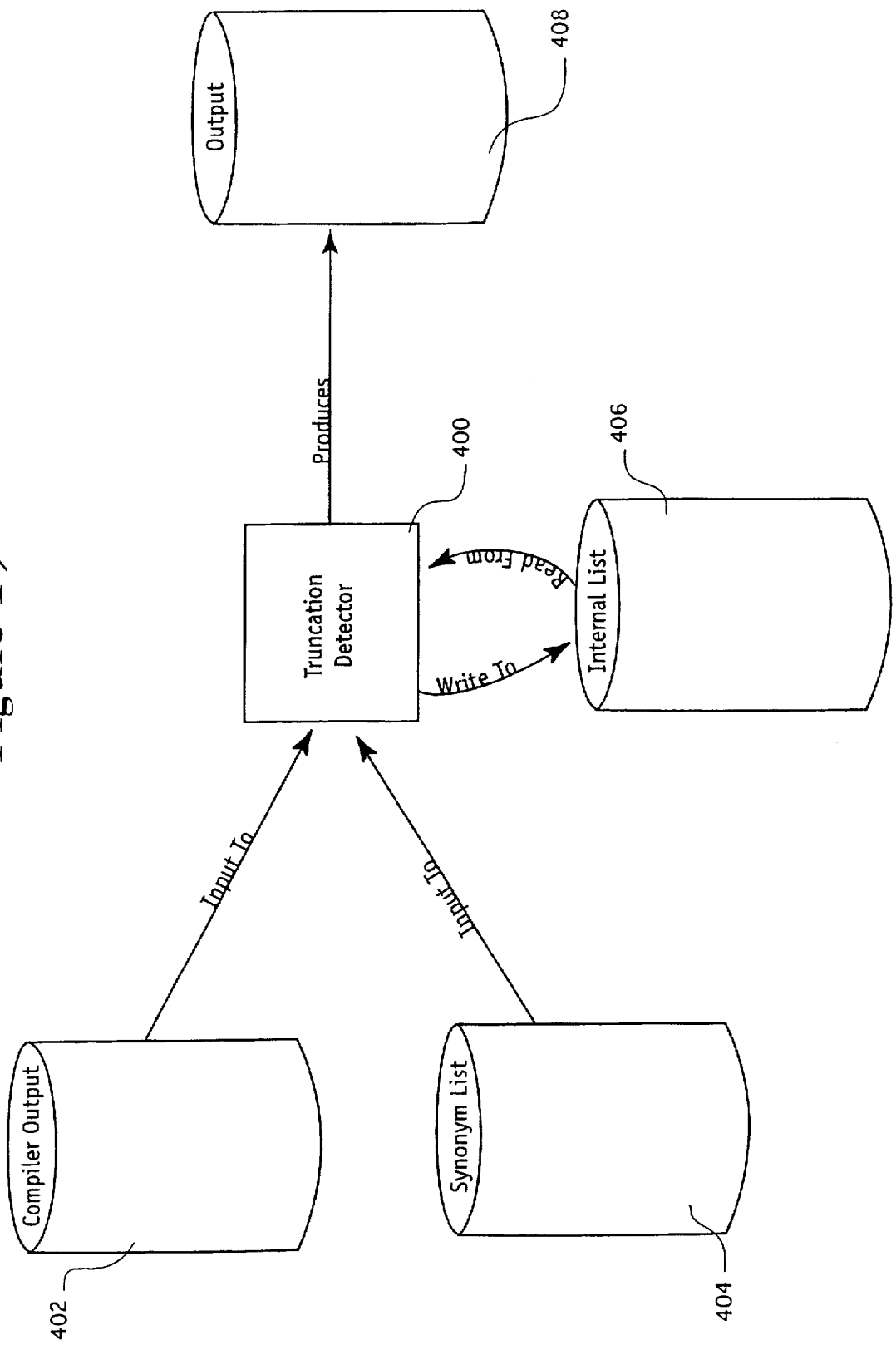
FIG. 19 is a system overview of the truncation detector used by the preferred embodiment of the present invention.

Individuals were also assisted with code modifications with the truncation detector. FIG. 19 provides a system overview of the truncation detector. The truncation detector 400 uses compiler output 402 as an input. It also utilizes the synonym list 404 to identify the variables which were to have been changed, and as with the Data Name Finder, it also uses an internal synonym list 406 which identifies variables not in the synonym list 404. The truncation detector 400 verifies the format of each variable against a specified format (which in the case is that the part number field should be at least 10 characters in length) and generates an output error file 408 containing variables that do not meet the format criteria prior to compilation of a program.

Figure 20:
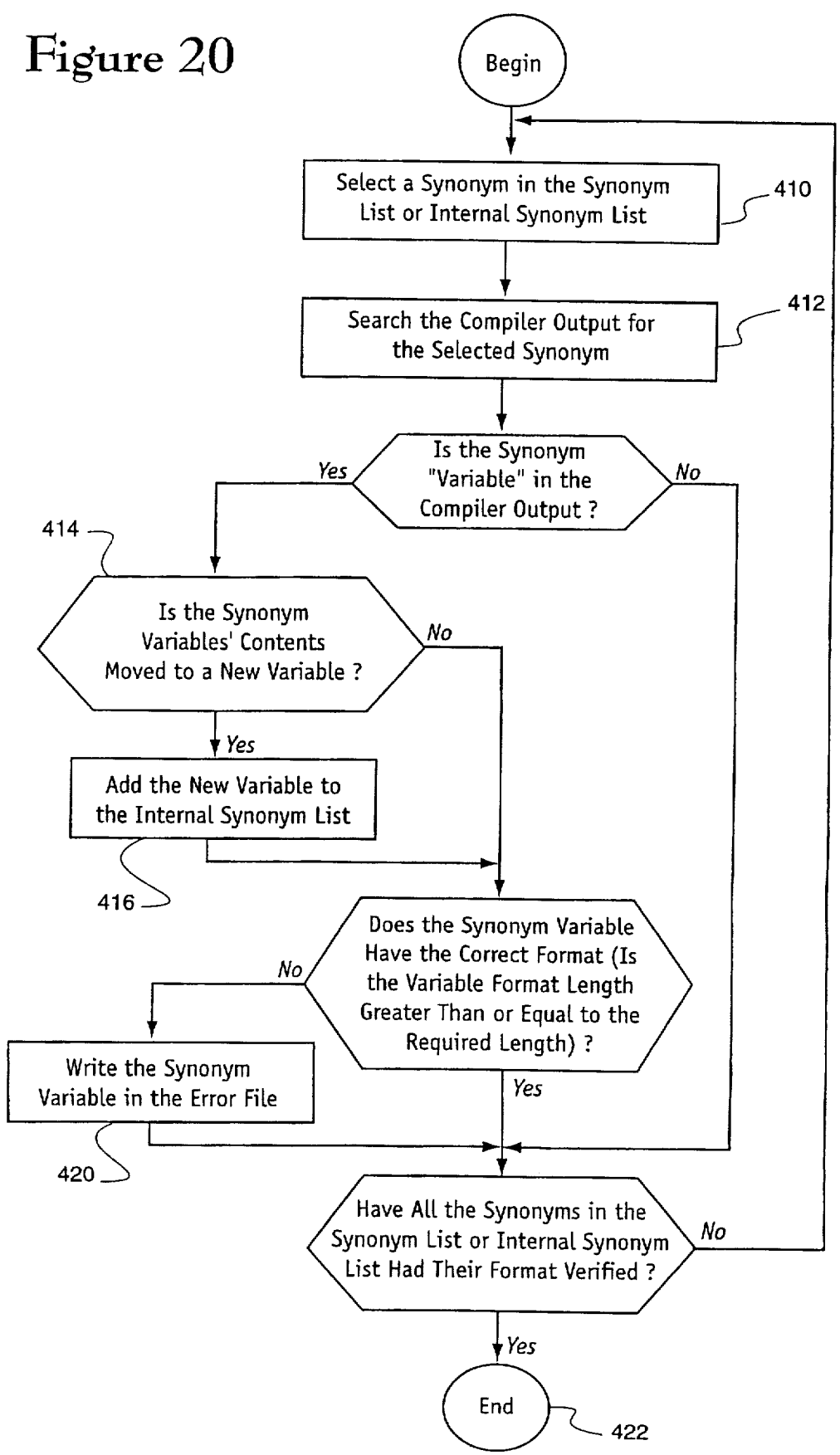
FIG. 20 is a flowchart of the functional flow of the truncation detector used by the preferred embodiment of the present invention.

FIG. 20 shows the functional flow for the truncation detector. The first step consists of selecting a synonym from the synonym list, or if that list has been exhausted, the internal synonym list 410. The compiler output is then searched for the selected synonym 412, and if the variable is present, a check is made to see if the synonym variables contents are moved to a new variable 414. If this is found, the new variable is added to the internal synonym list 416. The format of the originally selected synonym is then verified to ensure the length is greater than or equal to the size required by the change 418. If the size is not greater than or equal to the size required by the change, the synonym variable is written to the error file 420. If all the synonyms in the synonym list and internal synonym list have been verified, the truncation detector ceases execution 422, otherwise, the above described process is repeated, starting with the selection of a synonym in the synonym list or internal synonym list 410.

The last tool used to assist in the changing the code, is the IMS bridge. The IMS Bridge facilitates the conversion of computer programs which access the hierarchical database IMS DL/I database (an IBM product). Specifically, the part number field of converted computer programs have a larger data size (i.e., ten positions for a part number datum) than what the IMS database had for its part number field (i.e., eight positions for a part number datum), the IMS Bridge is used to allow modification of the program without changing the IMS DL/I database.

Figure 21:
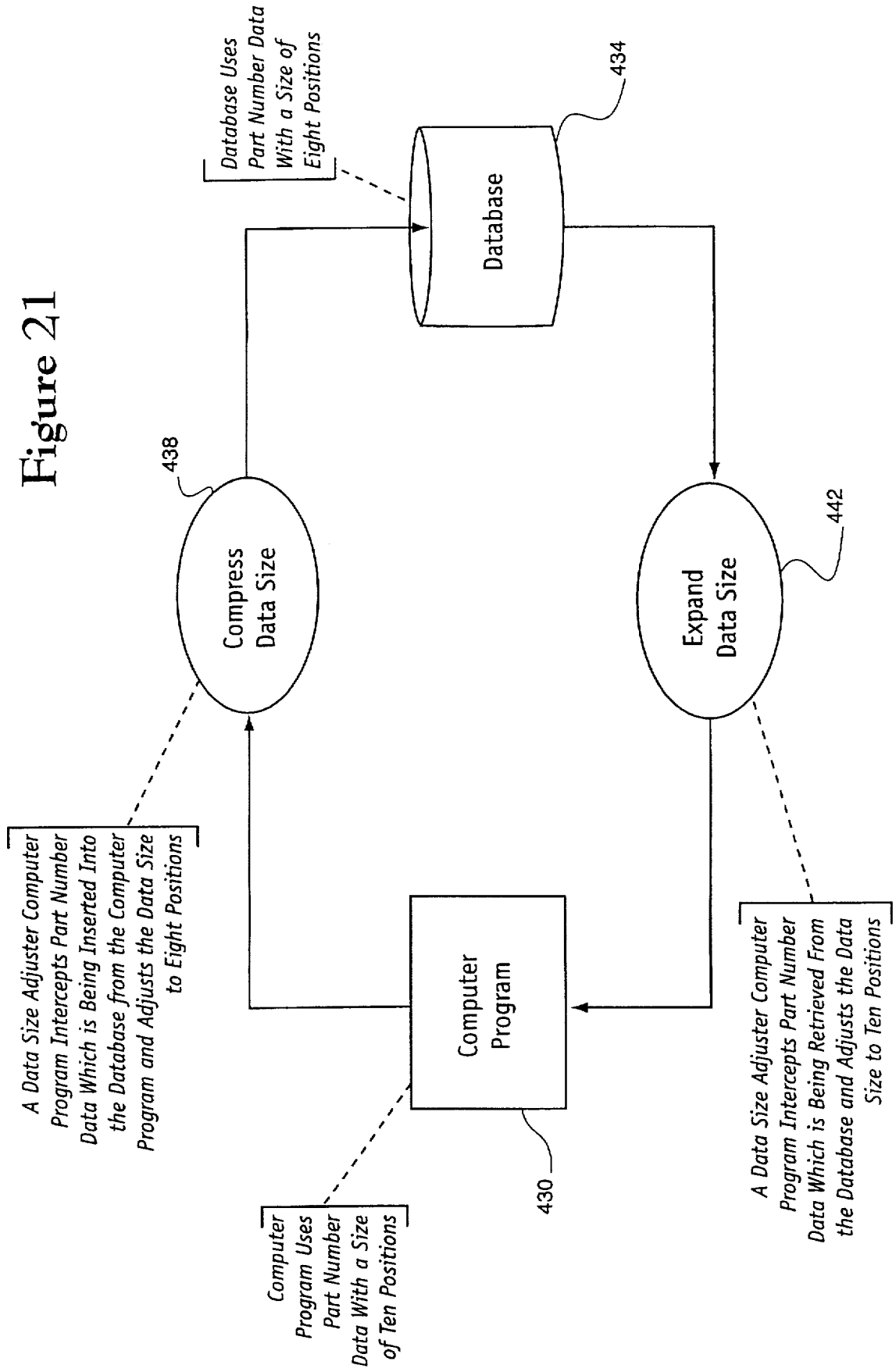
FIG. 21 is a system flow diagram depicting one mode of operation for adjusting sizes of data being exchanged between a computer program and a database.

FIG. 21 provides an example of one operational sequence of the IMS Bridge. The calls from a computer program 430 to an IMS database 434 are intercepted. The intercepting routine at function 438 compresses the Part Number field(s) to eight positions and passes to the IMS database 434 the current segment size on a Replace or Insert. The IMS Bridge expands at function 442 the Part Number field(s) and segment size, when the computer program 430 is accessing data from the IMS database 434.

Figure 22:
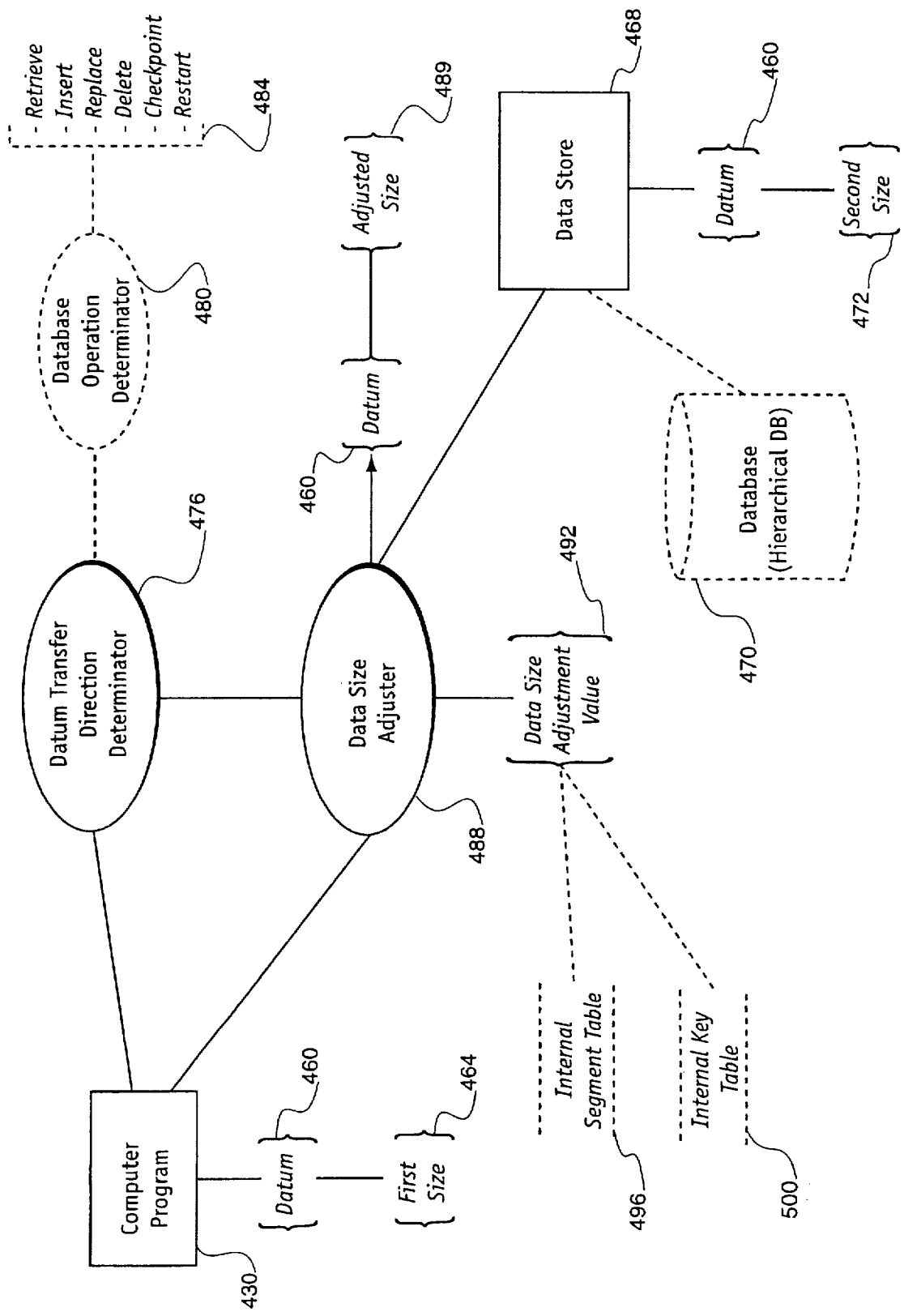
FIG. 22 is an entity relationship diagram depicting the interrelationships of the data size adjuster and the datum transfer direction determinator.

FIG. 22 depicts the interrelationship between the IMS Bridge and its environment. A computer program 430 uses a datum 460 (e.g., a part number field) with a first size 464, such as ten positions. A data store 468 (e.g., a hierarchical IMS database 70) uses the datum 460 but with a second size 472, such as eight positions.

A datum transfer direction determinator 476 determines the direction by which the data will be exchanged. The direction indicates whether a datum is being transferred to the computer program 430 or to the data store 468. A database operation determinator 480 is used to examine the database operation being used to effect the exchange of data between the computer program 430 and the data store 468. A list 484 provides an example of the type of database operation which the database operation determinator 480 can use to determine the direction of the exchange. For example a retrieval database operation indicates that the direction for the exchange of data is from the data store 468 to the computer program 430.

The data size adjuster 488 adjusts the size of the datum 460 which is being exchanged between the computer program 430 and the data store 468 so that a datum 460 with an adjusted size 489 is produced. The adjustment of the size of the datum is based upon the determined datum transfer direction and upon a predetermined data size adjustment value 492. The data size adjustment value 492 indicates how much the data size should be expanded or compressed. For example, the data size adjustment value 492 would be two if the computer program 430 has size of the datum at ten and the data store 468 has the size of the datum at eight. Therefore, a compression of a datum from ten places to eight places deletes the last two positions (i.e., ending positions) of a predetermined number of the datum, and an expansion of a datum from eight places to ten places involves "padding" the datum with two blank spaces (each of EBCDIC value of 40 decimal) at the end of the datum.

The data size adjuster 488 is disposed between the computer program 430 and the data store 468 so that the datum is effectively intercepted before the datum has been received by the data store 468 or is effectively intercepted before the computer program 430 receives the requested datum depending upon the datum transfer direction.

An internal segment table 496 and an internal key table 500 store the data size adjustment value 492 for each particular datum type. The structure of the internal segment table 496 and the internal key table 500 is discussed in greater detail below.

Within the IMS environment, the IMS Bridge uses four called computer routines beginning with 'CBLTCONV'. The 'CBLTCONV' routine replaces the 'CBLTDLI' routine. The 'CBLTDLI' routine has the function of performing database operations against an IMS database from a COBOL or assembler program. The 'CBLTCONV' routine has the function of performing the same database operations as the CBLTDLI routine while expanding/compressing I/O areas and compressing SSAs when found in internal tables.

The IMS Bridge allows the computer program conversion and expansion of Part Number fields independent to the database conversion. Any IMS on-line or batch program that converts its I/O area to accept expanded Part Number field(s), has the normal call to IMS changed from 'CBLTDLI' to 'CBLTCONV', whenever it is attempting to Get, Replace, Insert to, or Delete data from the 'converted' database. The I/O area refers to the segment(s) or records retrieved or to be inserted or updated from/to an IMS database. The parms passed to 'CBLTDLI' are the same parms currently passed to 'CBLTDLI'. The term "parms" refers to any items following a call (i.e. database operation, db pcb, I/O area, and SSAs). The call to 'CBLTCONV' could be dynamic.

Program 'CBLTCONV' is an assembler program that counts the number of parms passed from the computer program. It also calls a Cobol program 'CONVCBL' dynamically.

Program 'CONVCBL' is a Cobol program that makes the call to IMS using 'CBLTDLI' before or after the I/O area and SSAs passed have been expanded or compressed. The term "SSA" refers to the keys or indexes passed to the IMS database to retrieve or update segment(s). Program 'CONVCBL' calls 'CONVSIZE'.

Program 'CONVSIZE' is an assembler program that expands or compresses the I/O areas and SSAs passed to it.

Therefore, the IMS Bridge consists of 4 called programs:
CBLTCONV (Assembler-called statically or dynamically)
CONVCBL (Cobol-called dynamically)
CBLTDLI (Standard IMS call, static)
CONVSIZE (Assembler-called dynamically)

Within the IMS environment, Cobol programs which access IMS databases use a "call" routine "CBLTDLI" supplied by IBM. This call routine requires information to be passed from the program to IMS to complete the desired database operation.

An example of a Call routine is as follows:

```
CALL 'CBLTDLI'
    using 'GU',      retrieval database operation
    db-pcb,          database information
    I/O area,        result of database retrieval
                     (segment)
    SSA              key or index used to retrieve data
```

The above "call" is replaced with:

```
CALL 'CBLTCONV'
    using 'GU',      retrieval database operation
    db-pcb,          database information
    I/O area,        result of database retrieval
                     (segment)
    SSA              key or index used to retrieve data
```

The 'GU' term above refers to 'get unique', which indicates to the IMS to get a specific segment(s). The term 'db-pcb' above refers to the application view of the database structure.

Figure 23:
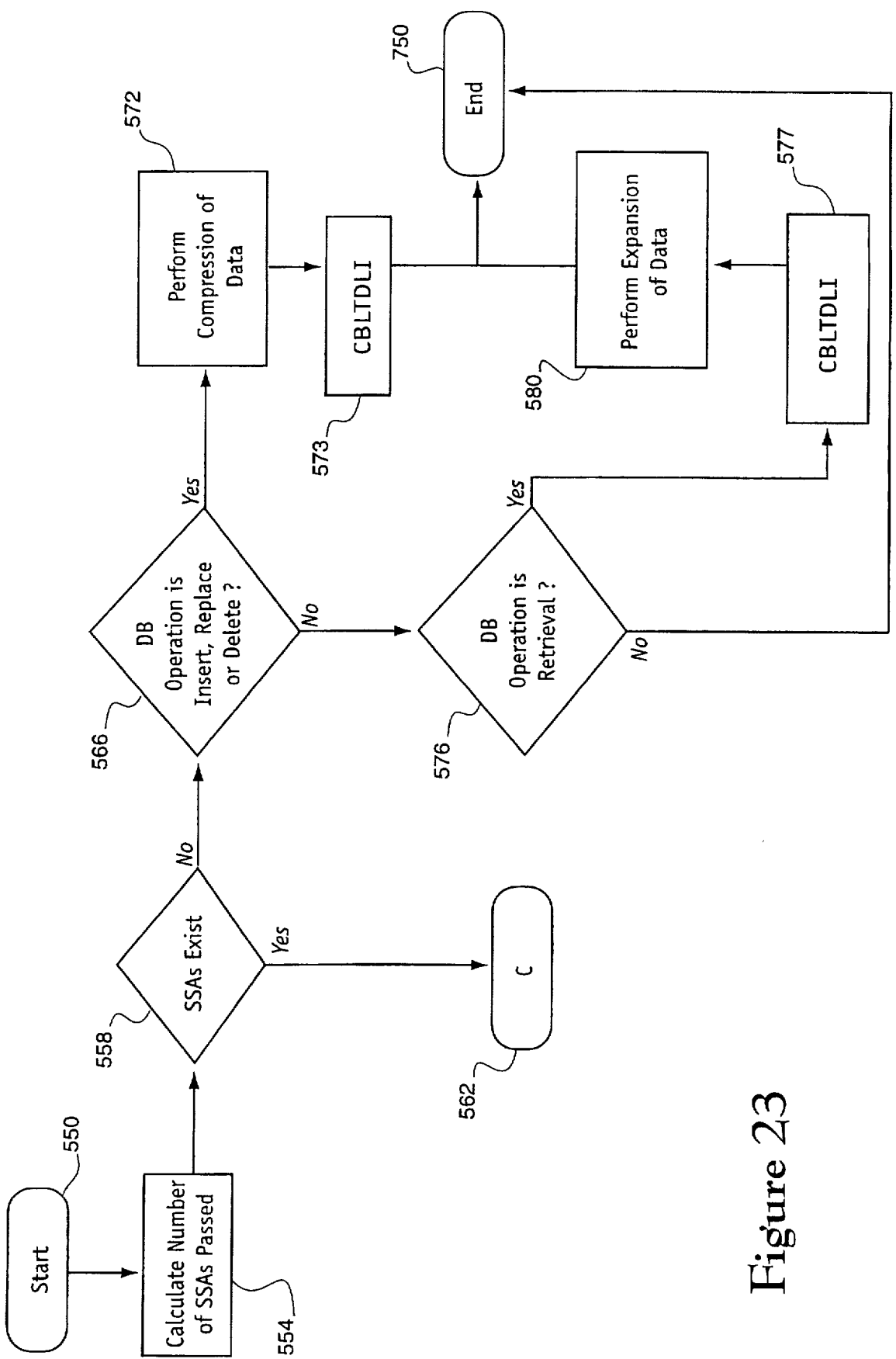
FIG. 23 is a flowchart depicting the functional flow for determining whether to compress or expand the size of data.

Referring to FIG. 23, the start block 550 indicates that the first block to be processed is block 554. At block 554, the number of items being passed from the application program are calculated. In other words, a CBLTDLI call typically requires a minimum of three pieces of information (db operation, db-pcb, I/O area) and up to fifteen SSAs. Depending on the database operation and the number of SSAs passed, there may be more than one segment in the I/O area.

If Decision block 558 determines that SSAs exist, then processing continues at continuation block C 562. The existence of SSAs refers to the possibility that the key needs to be compressed. If Decision block 558 determines that SSAs do not exist, then processing continues at decision block 566.

If decision block 566 determines that the database operation is an insert, replace or delete operation, then block 572 is performed. Block 572 performs compression of the I/O area and then the CBLTDLI routine is called at block 573 before terminating at end block 750.

If decision block 566 determines that the database operation is not an insert, replace or delete operation, then decision block 576 is performed. If decision block 576 determines that the database operation is a retrieval, then the CBLTDLI routine is called at block 577 and the I/O are is expanded at block 580 before terminating at end block 750. If decision block 576 determines that the database operation is not a retrieval, then processing terminates at end block 750.

Figure 24:
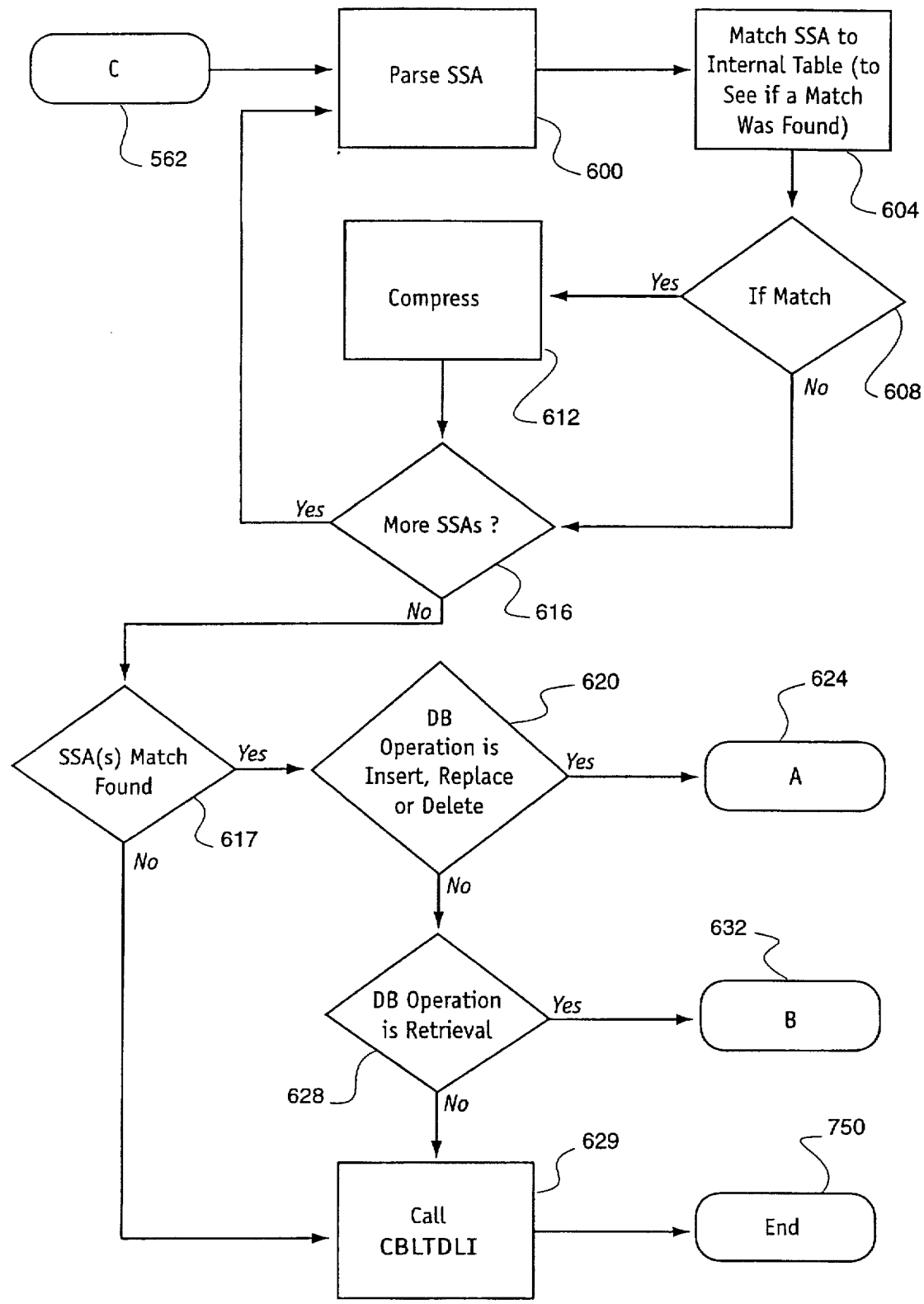
FIG. 24 is a flowchart depicting the functional flow for when segments exist.

Referring to FIG. 24, continuation block C 562 indicates that block 600 is to be processed wherein the SSAs are parsed. At block 604, the SSAs are matched to the internal table to see if a match was found in the table. If decision block 608 finds a match, then the I/O area is compressed at block 612, else decision block 616 is immediately processed.

If Decision block 616 determines that there are more SSAs, then processing continues at block 600. If Decision block 616 determines that there are no more SSAs, then processing continues at decision block 617. For each match found in the internal table as determined at decision block 617, processing continues at decision block 620; else processing continues at block 629 wherein the CBLTDLI routine is called before terminating at end block 750.

If decision block 620 determines that the database operation is an insert, replace or delete, then processing continues at continuation block A 624. If decision block 620 determines that the database operation is not an insert, replace or delete, then processing continues at decision block 628. If decision block 628 determines that the database operation is a retrieval, then processing continues at continuation block B 632. If decision block 628 determines that the database operation is not a retrieval, then processing continues at block 629.

Figure 25:
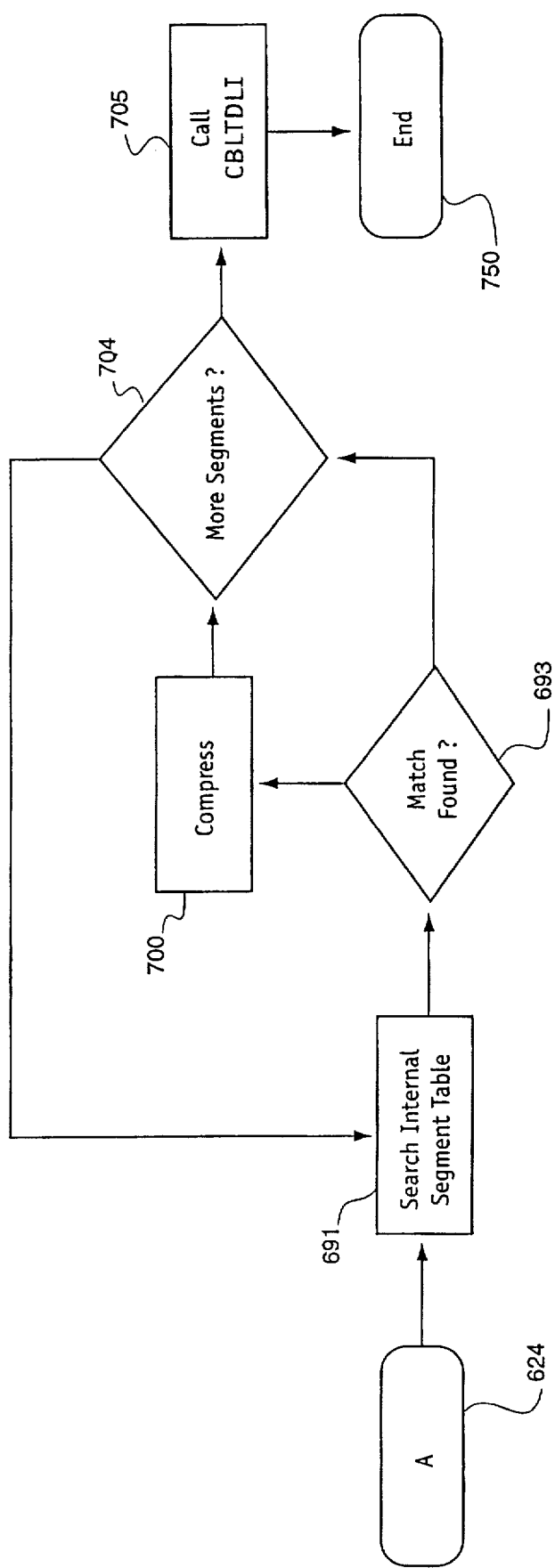
FIG. 25 is a flowchart depicting the functional flow for compressing data sizes.

Referring to FIG. 25, continuation block A 624 indicates that block 691 is to be processed wherein the internal segment table is searched. If a match is found at decision block 693, then the I/O area is compressed at block 700 and decision block 704 is processed next. If a match is not found at decision block 693, then decision block 704 is processed.

If decision block 704 determines that there are more segments, then processing continues at block 691, else processing continues at block 705. Block 705 calls the CBLTDLI routine and then processing is terminated at end block 750.

Figure 26:
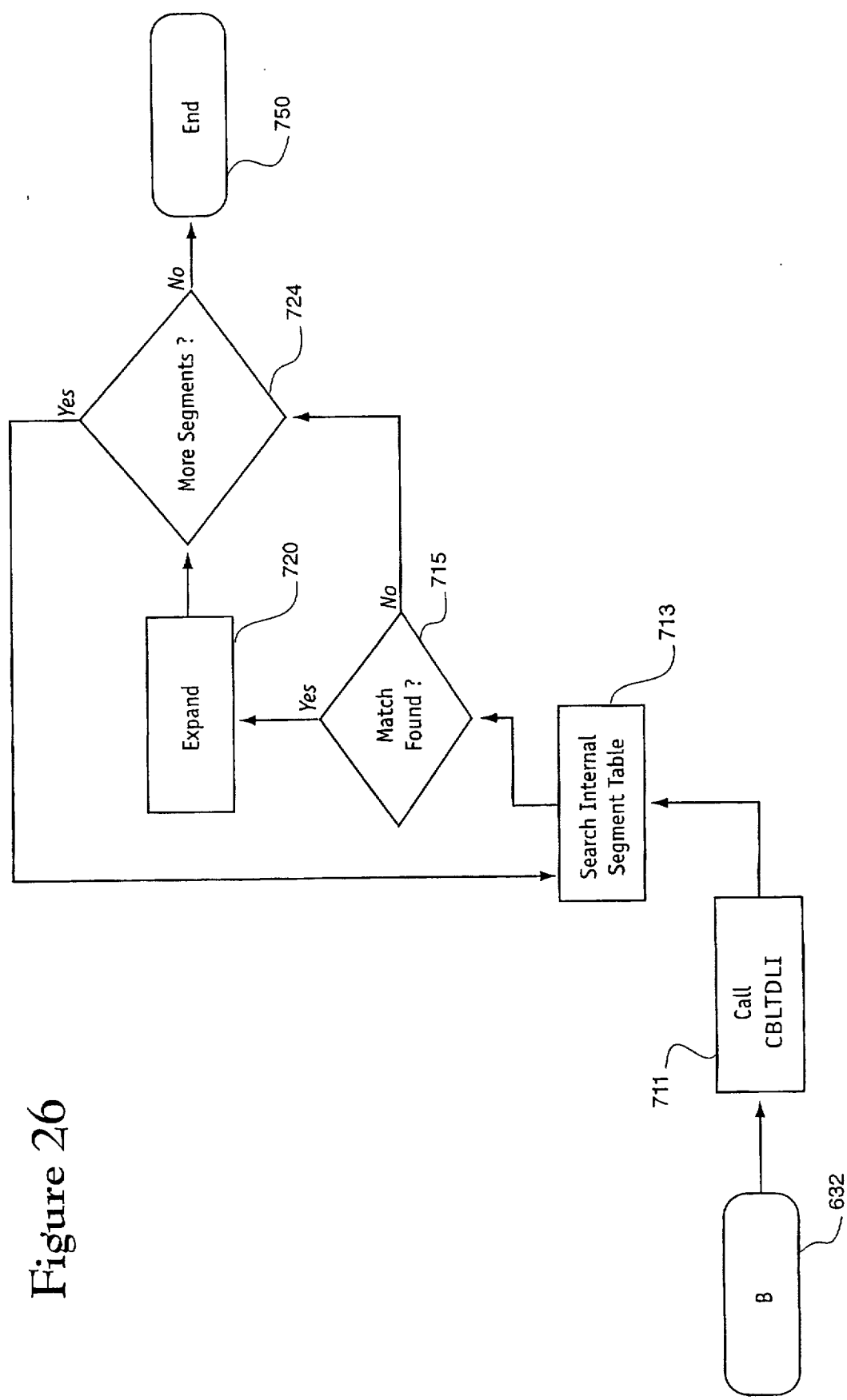
FIG. 26 is a flowchart depicting the functional flow for expanding data sizes.

Referring to FIG. 26, continuation block B 632 indicates that block 711 is to be processed wherein the CBLTDLI routine is called. Next, block 713 searches the internal segment table. If a match is found at decision block 715, then the I/O area is expanded at block 720 and decision block 724 is processed next. If a match is not found at decision block 715, then decision block 724 is processed. If decision block 724 determines that there are more segments, then processing continues at block 713, else processing terminates at end block 750.

The following processing is performed for compressing the I/O area from the computer program: using information from a prior retrieval operation, internal segment table and the SSAs passed, determine the size of the I/O area, the positions and lengths of the segment to be compressed; calls are then made to an assembler routine CONVSIZE to do the actual compression; a call is made for each segment in the I/O area. If the I/O area has more than one segment, the size of the I/O area as well as positions in the segment to be compressed are adjusted after each call to CONVSIZE.

After the SSA's and the I/O area are compressed, the normal CBLTDLI call is made. Control is returned to the application program (IMS returns a status).

The following processing is performed for expanding the I/O area from the computer: after SSAs are compressed, the normal CBLTDLI call are used to fill the I/O area; if the call was successful, the information from the internal segment table is used and the SSAs are passed, then the size of the I/O area is determined as well as the positions and lengths of the segments to be expanded.

Calls are then made to an assembler routine CONVSIZE to do the actual expansion. The number of calls depends on the number of segments returned from IMS. The expanded I/O area is passed to the application program. If the call was unsuccessful, return control to the application program, as well as IMS return status.

The following processing is performed to parse the SSAs as issued from the computer program: determine if the SSA has a valid, type, length or boolean operation present.

The following processing is performed for compressing the SSAs: Determine where in key, field is to be compressed; a call is made to assembler routine CONVSIZE to compress SSAs.

Internal Segment Table

The internal segment table is used to expand or compress the I/O area passed to program CONVCBL depending on the function call passed. It contains the database name, segment name, segment size, the ending position of the part number and the size to expand or compress. Currently the table allows for 25 occurrences of part numbers per segment. Since some calls to IMS may include path calls it is necessary to enter all the segments within a database and their size though the segment may not contain a part number. The program allows for five rows for the same segments. In other words 5×5 or 25 occurrences. The table below reflects five rows allowing 25 positions for expansion or compression. An example of an internal segment table is as follows:

```
01  DBD-SEGMENT-TABLE.
    05  DBD-SEG-TABLE.
        10  FILLER                    PIC X (45) VALUE
        'OCPTSDBDSFPARTRT02800008200882011620000000000'.
        12345678901234567890123456789012345678901 2345
                 1         2         3         4
    05  FILLER REDEFINES DBD-SEG-TABLE.
        10  DBD-SEG-TBL               OCCURS 20 TIMES.
            INDEXED BY DBD-SEG-INDX.
            15  DST-DBD-SEG-NAME      PIC X(16)
            15  DST-SEG-SIZE          PIC 9(4)
            15  DST-SEGMENT-PART      OCCURS 5 TIMES
                INDEXED BY DBD-SEG-PART-INDX.
                20  DST-PART-END-POS  PIC 9(4).
                20  DST-CHNG-LENGTH   PIC 9.
```

In the above example:

| | | | |
|---|---|---|---|
| Positions 1 | - 8: | Database Name: | OCPTSDBD |
| Positions 9 | - 16: | Segment Name: | SFPARTRT |
| Positions 17 | - 20: | Segment Size: | 0280 |
| Positions 21 | - 24: | 1st PartNo ending position: | 0088 |
| Positions 25 | - 25: | 1st PartNo change length | 2 |
| Positions 26 | - 29: | 2nd PartNo ending position: | 0116 |
| Positions 30 | - 30: | 2nd PartNo change length | 2 |
| Positions 31 | - 34: | 3rd PartNo ending position: | 0000 |
| Positions 35 | - 35: | 3rd PartNo change length | 0 |
| Positions 36 | - 39: | 4th PartNo ending position: | 0000 |
| Positions 40 | - 40: | 4th PartNo change length | 0 |
| Positions 41 | - 44: | 5th PartNo ending position: | 0000 |
| Positions 45 | - 45: | 5th PartNo change length | 0 |

Since part number occurred twice on the segment (a maximum of 25 part number occurrences are allowed), the two ending positions of part number and their corresponding change length were entered. If part number did not occur in the segment, but the segment could be used in a path call enter the database name, segment name and the segment size. The remainder of the fields should be zeroes.

New entries to the table requires the occurs statement to be modified. Entries in the table do not have to be in any particular order. A find all on x(45) will determine how many occurrences this table should have. If an error is made the Cobol compiler will catch the error.

Internal Key Table

The internal key table contains the database name, segment name, the key name, the ending position of the part number and the size to compress. Only the keys that contain part number are entered into this table. An example of an internal key table is as follows:

```
01  DBD-SEGMENT-KEY-TABLE.
    05  DBD-SEG-KEY-TABLE.
        10  FILLER                          PIC X(49) VALUE
'OCPTSDBDSFPARTRTFKPRTNBR00082000000000000000000000'.
1234567890123456789012345678901234567890123456789 0
         1         2         3         4
    05  FILLER REDEFINES DBD-SEG-KEY-TABLE.
        10  DBD-SEG-KEY-TBL           OCCURS 25 TIMES
            INDEXED BY DBD-SEG-KEY-INDX.
            15  DSKT-DBD-SEG-KEY-NAME   PIC X(24).
            15  DSKT-KEY-PART           OCCURS 5 TIMES.
                20  DSKT-PART-END-POS   PIC 9(4).
                20  DSKT-CHNG-LENGTH    PIC 9.
```

In the above example:

| | |
|---|---|
| Positions 1–8: | Database Name: OCPTSDBD |
| Positions 9–16 | Segment Name: SFPARTRT |
| Positions 17–24: | Segment Key Name: FKPRTNBR |
| Positions 25–28: | 1st PartNo ending position: 0008 |
| Positions 29–29: | 1st PartNo change length 2 |
| Positions 30–33: | 2nd PartNo ending position: 0000 |
| Positions 34—34: | 2nd PartNo change length 0 |
| Positions 35–38: | 3rd PartNo ending position: 0000 |
| Positions 39–39: | 3rd PartNo change length 0 |
| Positions 40–43: | 4th PartNo ending position: 0000 |
| Positions 44—44: | 4th PartNo change length 0 |
| Positions 45–48: | 5th PartNo ending position: 0000 |
| Positions 49—49: | 5th PartNo change length 0 |

Entries need to be made to this table only if the key to the segment or the alternate key contain a part number. If a key is concatenated (with 2 or more part numbers or a part number and something else like a date), the position is entered where the part number(s) ends (a maximum of 25 part number occurrences are allowed). A find all on x(49) will determine how many occurrences this table should have. If an error is made the Cobol compiler detects the error.

The following is an example of an SSA:

```
01  SSA-QUAL-SFPARTRT-SEGMENT.
    05  SSA-QUAL-SFPARTRT-SEG-NAME    PIC X(08) VALUE 'SFPARTRT'.
    05  SSA-QUAL-SFPARTRT-QUAL        PIC X(01) VALUE '('.
    05  SSA-QUAL-SFPARTRT-KEY-NAME    PIC X(08) VALUE 'FKPRTNBR'.
    05  SSA-QUAL-SFPARTRT-OPER        PIC X(02) VALUE '='.
    05  SSA-QUAL-SFPARTRT-KEY         PIC X(10) VALUE SPACES.
    05  SSA-QUAL-SFPARTRT-END         PiC X(01) VALUE ')'.
```

In this example, FKPRTNMBR is the key to the SFPARTRT segment in the OCPTSDBD database. The length of the part number defined to IMS is 8 (application program will pass a 10 position part number) and the size is to be truncated 2 positions.

Once changes in a partition have been implemented, unit, string, and subsystem testing is conducted. The unit testing is generally conducted by the individual making the actual code modifications of a single object. It involves simulating program input and output, allowing verification that the program internals are correctly functioning. The string testing involved testing interdependencies between highly related programs. If one program writes to a file, and a program reads from the same file, a string test ensures both programs are using the proper format. Subsystem testing is string testing with the use of actual data used during system operation. This verifies that the functions work as defined by the customers and that the system operates on all permutations of data. Lastly, in the case of large partitions, multiple inter-related systems were testing in conjunction. This is a production test, performed on the day the programs are incorporated for actual production, and ensures that programs function to support existing processes. If a failure occurs at this level of test, the entire partition is backed out of production.

The last step in the redevelopment process entails implementing each changed partition. This occurs after a programmer knows which production elements are going to modified, and a DCCS project is created which includes all the specific elements to be changed.

Figure 27:
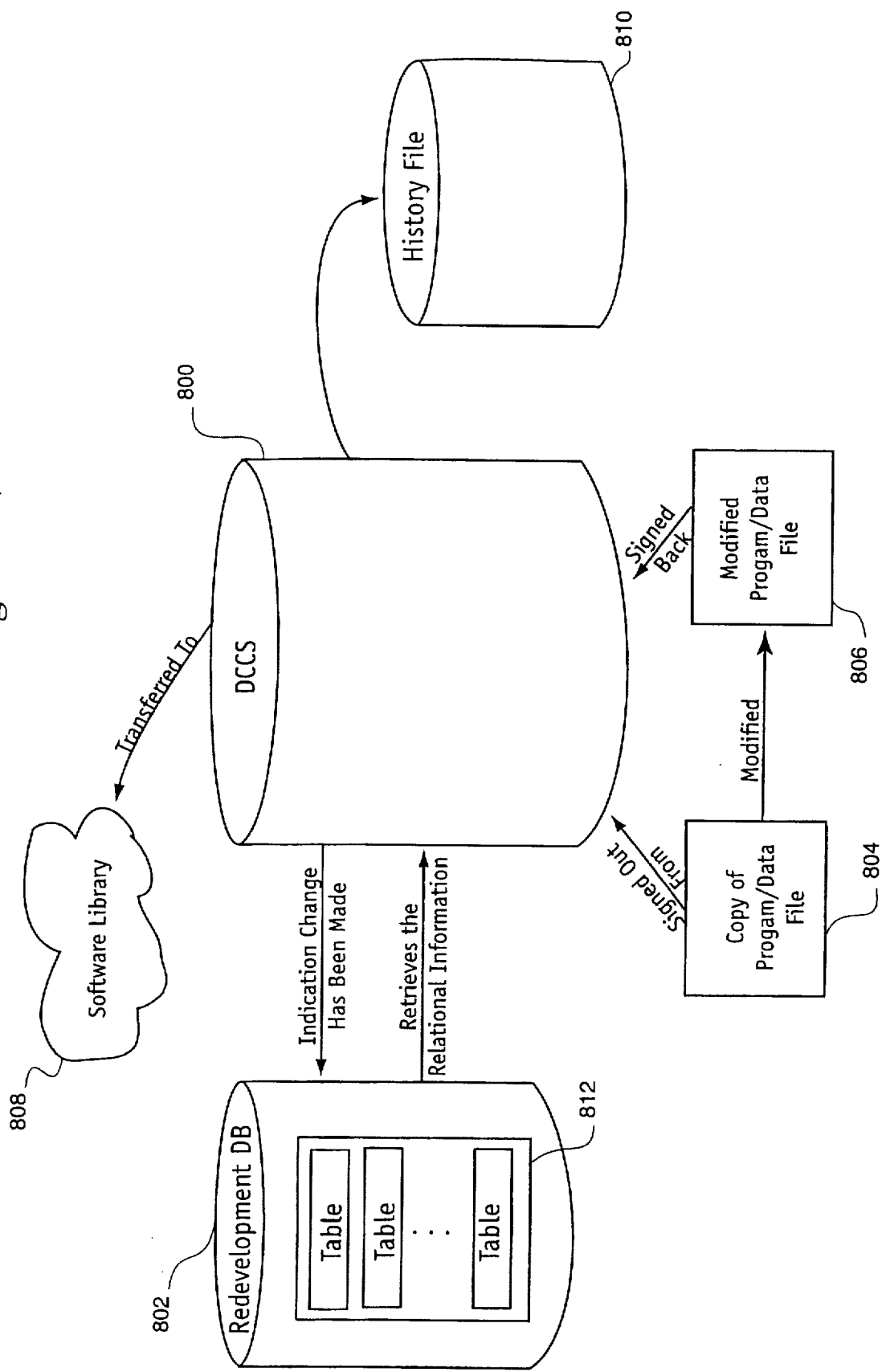
FIG. 27 is an illustration of the interaction between the redevelopment system and the DCCS (change management system).

FIG. 27 shows the program and data flow between the DCCS 800 and the Redevelopment data base 802. Prior to implementing a change to a particular program (or data file), a copy of the program 804 to be modified is obtained from the DCCS 800, and "signed out" by the programmer. This prohibits the existence of multiple copies being changed by different groups or programmers. After the changes are made and successfully tested, the modified program 806 is signed back into the DCCS 800. After all the programs and data files of a given partition are signed back into the DCCS 800, the partition owner establishes a production date for implementation.

When the DCCS project implementation date matches the current date, elements are transferred to the software library 808. In most cases, the current executing programs and data files are moved to a history file 810 that may be used to back the changed objects out if a problem is discovered. The status of production implementation is recorded in the DCCS 800 so that the owning programmer of the project and production operation personnel can track the project status.

As the DCCs 800 records production implementation, the indication of a production transfer is used to communicate to the redevelopment database 802 that a change has been made. The redevelopment database 802 retrieves the relational information concerning the elements which have changed, and updates the redevelopment tables 812 to reflect the changes. This update is executed nightly to keep the redevelopment data base as current as possible.

From the foregoing, it will be seen that the present invention provides a complete system and process for conducting large scale modifications to large software systems. The system is capable of being integrated with a wide variety of information systems. Therefore, while the invention is illustration and described in conjunction with a certain information system and a specific software change, it will be understood that the principles of the invention can be adapted to virtually any Information system and software change. Accordingly, it should be understood that the present invention is capable of certain modification and change without departing from the spirit of the invention as set forth in the appended claims.

APPENDIX 1

INDEX REPORT FOR DATABASE 'G220'

| DB NAME | TABLE NAME | INDEX NAME | C L U S | U N I Q | L O G D | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|---|
| G220 | RD_ACTIVITY_LOG | RDIXSP01 | U | Y | Y | 7 | 583685 | 100 | A A | MESSAGE_ID LOG_TIMESTAMP | INTEGER TIMESTMP | 4 10 | 9 1 | 1 2 |
| | RD_ACTUAL_PARM | RDIXSP02 | U | Y | Y | 15250 | 770503 | 100 | A A A A | COMP_UNIT_ID TRANSFER_TARGET XFR_SEQUENCE SEQUENCE | INTEGER CHAR INTEGER INTEGER | 4 8 4 4 | 4 3 2 1 | 1 2 3 4 |
| | RD_ANALYSIS_QUEUE | RDIXSP04 | U | Y | Y | 4610 | 4610 | 100 | A | CREATE_TIMESTAMP | TIMESTMP | 10 | 3 | 1 |
| | RD_BATCH_JOB | RDIXSP05 | U | Y | Y | 8 | 55156 | 100 | A A | SITE_CD BATCH_JOB_NAME | CHAR CHAR | 6 8 | 12 1 | 1 2 |
| | RD_CHANGE_FOCUS | RDIXSP06 | U | Y | Y | 1 | 145948 | 100 | A A A | PROJECT_CD COMP_UNIT_ID ALIAS_ID | CHAR INTEGER INTEGER | 6 4 4 | 7 5 6 | 1 2 3 |
| | RD_CHANGE_IMPACT | RDIXSP07 | U | Y | Y | 6 | 6 | 100 | A | IMPACT_ID | INTEGER | 4 | 1 | 1 |
| | | RDIXSP53 | D | N | Y | 6 | 6 | 100 | A | MEMBER_ID | INTEGER | 4 | 18 | 1 |
| | RD_CHANGE_NOTICE | RDIXSP08 | U | Y | Y | 424 | 424 | 100 | A | CREATE_TIMESTAMP | TIMESTMP | 10 | 1 | 1 |
| | RD_CHANGE_PROJECT | RDIXSP09 | U | Y | Y | 1 | 1 | 100 | A | PROJECT_CD | CHAR | 6 | 1 | 1 |
| | RD_CICS_DATASET | RDIXSP10 | U | Y | Y | 7 | 380 | 100 | A A A A | SITE_CD DATASET_NAME CICS_REGION_NAME CICS_FILE_NAME | CHAR CHAR CHAR CHAR | 6 56 8 8 | 4 3 1 2 | 1 2 3 4 |

1995-04-17 11:23:47

INDEX REPORT FOR DATABASE 'G230'

| DB NAME | TABLE NAME | INDEX NAME | U N I Q | C L U S | C L U S D | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|---|
| G230 | RD_CICS_FILE | RDIXSP11 | U | Y | Y | 4 | 28 | 100 | A A A | SITE_CD<br>CICS_REGION_NAME<br>CICS_FILE_NAME | CHAR<br>CHAR<br>CHAR | 6<br>8<br>8 | 2<br>3<br>1 | 1<br>2<br>3 |
| | RD_CICS_REGION | RDIXSP12 | U | Y | Y | 11 | 155 | 100 | A A | SITE_CD<br>CICS_REGION_NAME | CHAR<br>CHAR | 6<br>8 | 3<br>1 | 1<br>2 |
| | RD_CNTL_XFER_SRC | RDIXSP13 | U | Y | Y | 41935 | 292397 | 100 | A A A A | COMP_UNIT_ID<br>TRANSFER_TARGET<br>SEQUENCE<br>MEMBER_ID | INTEGER<br>CHAR<br>INTEGER<br>INTEGER | 4<br>8<br>4<br>4 | 2<br>4<br>3<br>1 | 1<br>2<br>3<br>4 |
| | RD_COMPILE_UNIT | RDIXSP14 | U | Y | Y | 54077 | 54077 | 100 | A | COMP_UNIT_ID | INTEGER | 4 | 1 | 1 |
| | | RDIXSP54 | D | N | Y | 54077 | 54077 | 99 | A | MEMBER_ID | INTEGER | 4 | 10 | 1 |
| | RD_CONTROL_XFER | RDIXSP15 | U | Y | Y | 41935 | 292283 | 100 | A A A | COMP_UNIT_ID<br>TRANSFER_TARGET<br>SEQUENCE | INTEGER<br>CHAR<br>INTEGER | 4<br>8<br>4 | 7<br>1<br>2 | 1<br>2<br>3 |
| | | RDIXSP64 | D | N | Y | 1 | 1 | 100 | A | CREATE_TOOL_ID | INTEGER | 4 | 5 | 1 |
| | RD_CYCLE_TO_JOB | RDIXSP16 | U | Y | N | 0 | 0 | 0 | A A A | JOB_CYCLE_CD<br>SITE_CD<br>BATCH_JOB_NAME | CHAR<br>CHAR<br>CHAR | 4<br>6<br>8 | 3<br>1<br>2 | 1<br>2<br>3 |
| | RD_DATA_ELMT_ALIAS | RDIXSP18 | U | Y | Y | 53301 | 36553637 | 100 | A A | COMP_UNIT_ID<br>ALIAS_ID | INTEGER<br>INTEGER | 4<br>4 | 1<br>2 | 1<br>2 |
| | RD_DATA_RECORD | RDIXSP19 | U | Y | Y | 47656 | 1449143 | 100 | A A A | COMP_UNIT_ID<br>ALIAS_ID<br>DATA_STORE_NAME | INTEGER<br>INTEGER<br>CHAR | 4<br>4<br>18 | 6<br>5<br>7 | 1<br>2<br>3 |
| | | RDIXSP65 | D | N | Y | 1 | 1 | 100 | A | CREATE_TOOL_ID | INTEGER | 4 | 3 | 1 |
| | RD_DATA_STORE | RDIXSP20 | U | Y | Y | 47219 | 437041 | 100 | A A | COMP_UNIT_ID<br>DATA_STORE_NAME | INTEGER<br>CHAR | 4<br>18 | 7<br>1 | 1<br>2 |
| | | RDIXSP66 | D | N | Y | 1 | 1 | 100 | A | CREATE_TOOL_ID | INTEGER | 4 | 4 | 1 |

1995-05-17 11.23.56                                                                                                    PAGE 1

INDEX REPORT FOR DATABASE 'G210'

| DB NAME | TABLE NAME | INDEX NAME | UNIQ | CLUS | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|
| G230 | RD_DATASET | RDIXSP17 | U Y | Y | 8 | 470224 | 100 | A A | SITE_CD DATASET_NAME | CHAR CHAR | 6 56 | 1 2 | 1 2 |

1995-05-17 11.23.56     PAGE 2

INDEX REPORT FOR DATABASE 'G240'

| DB NAME | TABLE NAME | INDEX NAME | UNIQ | CLUS | FIRST KEY | FULL KEY | CLUST RATIO | ASC/DESC | COL NAME | COL TYPE | COL LENGTH | COL NMBR | COL SEQ |
|---|---|---|---|---|---|---|---|---|---|---|---|---|---|
| G240 | RD_DB2_SUBSYSTEM | RDIXSP21 | U Y | Y | 0 | 0 | 0 | A A | SITE_CD<br>DB2_SUBSYSTEM_NAME | CHAR<br>CHAR | 6<br>8 | 6<br>1 | 1<br>2 |
| | RD_DB2_TABLE | RDIXSP22 | U Y | Y | 4 | 11090 | 100 | A A A A | SITE_CD<br>DB2_SUBSYSTEM_NAME<br>TABLE_CREATOR<br>TABLE_NAME | CHAR<br>CHAR<br>CHAR<br>CHAR | 6<br>8<br>18<br>18 | 3<br>4<br>1<br>2 | 1<br>2<br>3<br>4 |
| | RD_DD_CONCAT | RDIXSP23 | U Y | Y | 8 | 3184365 | 100 | A A A A A | SITE_CD<br>BATCH_JOB_NAME<br>JOB_STEP_SEQ<br>DD_NAME<br>CONCATENATION_SEQ | CHAR<br>CHAR<br>INTEGER<br>CHAR<br>INTEGER | 6<br>8<br>4<br>8<br>4 | 1<br>2<br>3<br>4<br>5 | 1<br>2<br>3<br>4<br>5 |
| | RD_DD_STMT | RDIXSP24 | U Y | Y | 8 | 3085032 | 100 | A A A A | SITE_CD<br>BATCH_JOB_NAME<br>JOB_STEP_SEQ<br>DD_NAME | CHAR<br>CHAR<br>INTEGER<br>CHAR | 6<br>8<br>4<br>8 | 5<br>6<br>7<br>1 | 1<br>2<br>3<br>4 |
| | RD_ELMT_AL_SRC | RDIXSP25 | U Y | Y | 52972 | 9678794 | 100 | A A A | COMP_UNIT_ID<br>ALIAS_ID<br>MEMBER_ID | INTEGER<br>INTEGER<br>INTEGER | 4<br>4<br>4 | 4<br>5<br>1 | 1<br>2<br>3 |
| | RD_ENTRY_POINT | RDIXSP26 | U Y | Y | 53294 | 53653 | 100 | A A | COMP_UNIT_ID<br>ENTRY_POINT_NAME | INTEGER<br>CHAR | 4<br>8 | 3<br>1 | 1<br>2 |
| | RD_EXECUTABLE | RDIXSP27 | U Y | Y | 15 | 53634 | 100 | A A | SITE_CD<br>LOAD_MODULE_ID | CHAR<br>INTEGER | 6<br>4 | 1<br>2 | 1<br>2 |
| | RD_FORMAL_PARM | RDIXSP28 | U Y | Y | 20116 | 90077 | 100 | A A A | COMP_UNIT_ID<br>ENTRY_POINT_NAME<br>SEQUENCE | INTEGER<br>CHAR<br>INTEGER | 4<br>8<br>4 | 1<br>2<br>3 | 1<br>2<br>3 |
| | RD_INCLUDED_MEMBER | RDIXSP29 | U Y | Y | 53664 | 524577 | 100 | A A | COMP_UNIT_ID<br>MEMBER_ID | INTEGER<br>INTEGER | 4<br>4 | 2<br>1 | 1<br>2 |
| | | RDIXSP55 | D N | N | 87999 | 87999 | 58 | A | MEMBER_ID | INTEGER | 4 | 1 | 1 |

52

INDEX REPORT FOR DATABASE 'G240'

| DB NAME | TABLE NAME | INDEX NAME | UNIQ | CLUS | USED | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|---|
| G240 | RD_INVOKE_RUN_UNIT | RDIXSP30 | U | Y | Y | 8 | 48778I | 100 | A | SITE_CD | CHAR | 6 | 1 | 1 |
| | | | | | | | | | A | BATCH_JOB_NAME | CHAR | 8 | 2 | 2 |
| | | | | | | | | | A | JOB_STEP_SEQ | INTEGER | 4 | 3 | 3 |

PAGE 2

1995-05-17 11.24.05

53

INDEX REPORT FOR DATABASE 'G250'

| DB NAME | TABLE NAME | INDEX NAME | C L U S T | U N I Q | A S G D | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|---|
| G250 | RD_JOB_CYCLE | RDIXSP31 | U | Y | N | 0 | 0 | 0 | A | JOB_CYCLE_CD | CHAR | 4 | 1 | 1 |
| | RD_JOB_STEP | RDIXSP32 | U | Y | Y | 8 | 487782 | 100 | A | SITE_CD | CHAR | 6 | 7 | 1 |
| | | | | | | | | | A | BATCH_JOB_NAME | CHAR | 8 | 8 | 2 |
| | | | | | | | | | A | JOB_STEP_SEQ | INTEGER | 4 | 1 | 3 |
| | | RDIXSP56 | D | N | N | 34432 | 34432 | 59 | A | MEMBER_ID | INTEGER | 4 | 6 | 1 |
| | RD_LANGUAGE | RDIXSP33 | U | Y | Y | 3 | 3 | 100 | A | LANGUAGE_CD | CHAR | 4 | 1 | 1 |
| | RD_LIBRARY | RDIXSP34 | U | Y | Y | 98 | 98 | 100 | A | LIBRARY_ID | INTEGER | 4 | 1 | 1 |
| | | RDIXSP57 | U | N | N | 11 | 98 | 62 | A | SITE_CD | CHAR | 6 | 6 | 1 |
| | | | | | | | | | A | LIBRARY_NAME | CHAR | 56 | 2 | 2 |
| | | RDIXSP58 | D | N | N | 51 | 51 | 56 | A | LIBRARY_NAME | CHAR | 56 | 2 | 1 |
| | RD_LIBRARY_TYPE | RDIXSP35 | U | Y | Y | 2 | 2 | 100 | A | LIBRARY_TYPE_CD | CHAR | 4 | 1 | 1 |
| | RD_LITERAL | RDIXSP36 | U | Y | Y | 53442 | 8919512 | 100 | A | COMP_UNIT_ID | INTEGER | 4 | 3 | 1 |
| | | | | | | | | | A | LITERAL_ID | INTEGER | 4 | 1 | 2 |
| | RD_LITERAL_SRC | RDIXSP37 | U | Y | Y | 53442 | 8919524 | 100 | A | COMP_UNIT_ID | INTEGER | 4 | 2 | 1 |
| | | | | | | | | | A | LITERAL_ID | INTEGER | 4 | 3 | 2 |
| | | | | | | | | | A | MEMBER_ID | INTEGER | 4 | 1 | 3 |
| | RD_MEMBER | RDIXSP38 | U | Y | Y | 185189 | 185189 | 100 | A | MEMBER_ID | INTEGER | 4 | 1 | 1 |
| | | RDIXSP59 | U | N | N | 96 | 185189 | 50 | A | LIBRARY_ID | INTEGER | 4 | 16 | 1 |
| | | | | | | | | | A | MEMBER_NAME | CHAR | 10 | 2 | 2 |
| | | RDIXSP60 | D | N | N | 152989 | 152989 | 48 | A | MEMBER_NAME | CHAR | 10 | 2 | 1 |
| | RD_MEMBER_TYPE | RDIXSP39 | U | Y | Y | 5 | 5 | 100 | A | MEMBER_TYPE_CD | CHAR | 4 | 1 | 1 |
| | RD_MESSAGE_TEXT | RDIXSP40 | U | Y | N | 0 | 0 | 0 | A | MESSAGE_ID | INTEGER | 4 | 1 | 1 |

1995-05-17 11.24.13

INDEX REPORT FOR DATABASE 'G260'

| DB NAME | TABLE NAME | INDEX NAME | U/D | UNIQ | CLUS | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|---|
| G260 | RD_PARTITION | RDIXSP41 | U | Y | Y | 3 | 3 | 100 | A | PARTITION_ID | INTEGER | 4 | 1 | 1 |
| | RD_RUN_UNIT | RDIXSP42 | U | Y | Y | 27693 | 27693 | 100 | A | RUN_UNIT_ID | INTEGER | 4 | 1 | 1 |
| | | RDIXSP62 | U | N | N | 8 | 27693 | 49 | A A | SITE_CD NAME | CHAR CHAR | 6 8 | 2 3 | 1 2 |
| | RD_RUN_UNIT_CONTNT | RDIXSP43 | U | Y | Y | 20119 | 25876 | 100 | A A | RUN_UNIT_ID COMP_UNIT_ID | INTEGER INTEGER | 4 4 | 2 1 | 1 2 |
| | | RDIXSP61 | D | N | N | 21096 | 21096 | 49 | A | COMP_UNIT_ID | INTEGER | 4 | 1 | 1 |
| | RD_SITE | RDIXSP44 | U | Y | Y | 14 | 14 | 100 | A | SITE_CD | CHAR | 6 | 1 | 1 |
| | RD_SOURCE_REF | RDIXSP45 | U | Y | N | 0 | 0 | 0 | A A | MEMBER_ID MEMBER_NAME | INTEGER CHAR | 4 10 | 5 1 | 1 2 |
| | RD_SQL_COLUMN | RDIXSP46 | U | Y | Y | 12368 | 2552515 | 100 | A A A | COMP_UNIT_ID DATA_STORE_NAME COLUMN_NAME | INTEGER CHAR CHAR | 4 18 18 | 2 3 1 | 1 2 3 |
| | RD_SQL_TABLE | RDIXSP47 | U | Y | Y | 12377 | 209438 | 100 | A A A A | COMP_UNIT_ID DATA_STORE_NAME TABLE_CREATOR TABLE_NAME | INTEGER CHAR CHAR CHAR | 4 18 18 18 | 3 4 1 2 | 1 2 3 4 |
| | RD_SUBSYSTEM | RDIXSP50 | U | Y | N | 0 | 0 | 0 | A | SUBSYSTEM_ID | INTEGER | 4 | 1 | 1 |

1995-05-17 11.24.22                                                              PAGE 1

INDEX REPORT FOR DATABASE 'G270'

| DB NAME | TABLE NAME | INDEX NAME | UNIQUE | CLUSD | FIRST KEY | FULL KEY | CLUST RATIO | ASC/ DESC | COL NAME | COL TYPE | COL LENGTH | COL NMBR | COL SEQ |
|---|---|---|---|---|---|---|---|---|---|---|---|---|---|
| G270 | RD_SYSTEM | RDIXSP51 | U Y | Y | 2 | 2 | 100 | A | SYSTEM_ID | INTEGER | 4 | 1 | 1 |
| | RD_TRANSACTION | RDIXSP52 | U Y | Y | 10 | 11138 | 100 | A | SITE_CD | CHAR | 6 | 5 | 1 |
| | | | | | | | | A | CICS_REGION_NAME | CHAR | 8 | 6 | 2 |
| | | | | | | | | A | TRANSACTION_NAME | CHAR | 8 | 1 | 3 |

1995-05-17 11.24.33

PAGE 1

APPENDIX 2

```
10/22/1996  10.56.24              MANAGER SOFTWARE PRODUCTS         PAGE     0001
UPDATE STATUS PREPROD                 DICTIONARY PRODD
```

```
* DJOBRES1-INDEX
*   UNIQUE
*     NAME-PROC-CENTR-ABRV      ASCENDING
*     NAME-CPTRJB               ASCENDING
* DJOBRES2-INDEX
*   DUPLICATE
*     NMBR-LOGON                ASCENDING
* DJOBRES3-INDEX
*   DUPLICATE
*     NMBR-DEPT-CPTRJB-RESP     ASCENDING
*     NAME-CPTRJB               ASCENDING
* DJOBRES4-INDEX
*   DUPLICATE
*     NAME-CPTRJB               ASCENDING
```

DESCRIPTION OF DJOBRES-COPYLIB

| PKEY | NULL | NAME | TYPE | LENGTH | REMARKS |
|------|------|------|------|--------|---------|
|      |      | DJOBRES_TBL | DB2-TABLE | 91 | THIS TABLE CONTAINS INFORMATION ON MVS JOBS THAT EXECUTE ON HPDC, CLDC AND ODDC. THE TABLE IS MAINLY USED BY PERSONNEL OF OPERATIONS AND CONTROLS WHEN A JOB ABORTS. THE INFORMATION LETS THEM KNOW WHO TO CONTACT AND THE COURSE OF ACTION. EX. IMMEDIATE, WAIT UNTIL MORNING, OR CALL TO SUPERVISOR IS REQUIRED. |
|      | D    | N_CENTR_ABRV | CHAR(5) | 5 | The abbreviated name of a process center, commonly known as a data center or a computer center -------------------------------- Definition below was derived from the ADW Corporate Encyclopedia -- ------------------------------- The abbreviated name of a process center commonly known as data center or computer center. |

57

```
10/22/1996  10.56.24                    MANAGER SOFTWARE PRODUCTS           PAGE      0002
UPDATE STATUS PREPROD                       DICTIONARY PRODD
```

| | | | | | |
|---|---|---|---|---|---|
| * D | * N_CPTRJB | * CHAR(8) | * | 8 | * The system name of a computer job |
| * D | * X_CPTRJB_DESC | * CHAR(25) | * | 25 | * THE DESCRIPTION OF THE COMPUTER JOB. IE. WHAT THE COMPUTER JOB DOES. |
| * D | * C_CPTRJB_ABND_ACTN | * CHAR(1) | * | 1 | * THIS CODE WILL INDICATE TO OPERATIONS WHAT ACTION SHOULD BE FOLLOWED IF THE COMPUTER JOB ABENDS (ABNORMAL TERMINATION). |
| * D | * I_LOGON | * CHAR(7) | * | 7 | * The system logon-id of an online system user for network access to IMS, CICS, TSO, Info-center, etc. Example: T1234AB. Typically used to denote the person making a change to a record. |
| * D | * I_DEPT_CPTRJB_RESP | * CHAR(4) | * | 4 | * THE DEPARTMENT NUMBER OF THE MIS AREA RESPONSIBLE FOR A COMPUTER JOB. |
| * D | * I_CPTRJB_RESP | * CHAR(4) | * | 4 | * THE CORPORATE LOCATION OF THE MIS AREA RESPONSIBLE FOR A COMPUTER JOB. |
| * D | * I_DEPT_CPTRJB_USER | * CHAR(4) | * | 4 | * THE DEPARTMENT NUMBER OF THE AREA THAT USES THIS COMPUTER JOB. |
| * D | * I_CPTRJB_USER | * CHAR(4) | * | 4 | * THE CORPORATE LOCATION OF THE AREA THAT USES THIS COMPUTER JOB. |
| * D | * D_UPD | * DATE | * | 10 | * The date the data structure was last updated ---------------------- -- Definition below was derived from the ADW Corporate Encyclopedia -- ----------------------------- The date the data structure was last updated. The date the ACF Department Authorizer was last updated. The date the ACF MIS Customer Authorizer was last updated. The date the data structure was last updated. The date the record was last updated. updated. |
| * D | * C_CPTRJB_TYP | * CHAR(1) | * | 1 | * The type of computer job |
| * D | * I_SYS | * DECIMAL(4) | * | 3 | * System identifier Definition below was derived from the ADW Corporate Encyclopedia -- --- A number to uniquely identify a system. |
| * D | * I_LOGON_RESP_JOB | * CHAR(7) | * | 7 | * THE TSO ID OR LOGON ID OF THE PERSON WHO IS RESPONSIBLE FOR A JOB. |
| * D | * N_CMPTRPGM | * CHAR(8) | * | 8 | * The unique name assigned to a specific computer program |

58

```
10/22/1996  10.56.24           MANAGER SOFTWARE PRODUCTS        PAGE    0003
UPDATE STATUS PREPROD              DICTIONARY PRODD

*     *      *                   *          *    * Definition below was derived from the ADW  *
      *     *      *                   *          *    * Corporate Encyclopedia -- ----------------*
      *     *      *                   *          *    *-------------------------------------------*
      *     *      *                   *          *    * --- The unique name assigned to a specific *
      *     *      *                   *          *    * computer program.                          *
      *     *      *                 * IN          *    * D020.DJOBRES                              *

DICTIONARY NAMES              DB2 NAMES
       ----------------              ---------
       NAME-PROC-CENTR-ABRV          N-CENTR-ABRV
       NAME-CPTRJB                   N-CPTRJB
       TEXT-CPTRJB-DESC              X-CPTRJB-DESC
       CODE-CPTRJB-ABND-ACTN         C-CPTRJB-ABND-ACTN
       NMBR-LOGON                    I-LOGON
       NMBR-DEPT-CPTRJB-RESP         I-DEPT-CPTRJB-RESP
       NMBR-CORPLOC-CPTRJB-RESP      I-CPTRJB-RESP
       NMBR-DEPT-CPTRJB-USER         I-DEPT-CPTRJB-USER
       NMBR-CORPLOC-CPTRJB-USER      I-CPTRJB-USER
       DATE-UPD                      D-UPD
       CODE-CPTRJB-TYP               C-CPTRJB-TYP
       NMBR-SYS                      I-SYS
       NMBR-LOGON-RESP-JOB           I-LOGON-RESP-JOB
       NAME-CMPTRPGM                 N-CMPTRPGM
```

10/22/1996  10.56.24               MANAGER SOFTWARE PRODUCTS           PAGE    0004
UPDATE STATUS PREPROD                  DICTIONARY PRODD

```
******************************************************************************
* GSYSTEM1-INDEX                                                              *
*    UNIQUE                                                                   *
*    NMBR-SYS                    ASCENDING                                    *
******************************************************************************
* DESCRIPTION OF GSYSTEM-COPYLIB                                              *
******************************************************************************
```

| PKEY | NULL | NAME | TYPE | LENGTH | REMARKS |
|---|---|---|---|---|---|
| | | GSYSTEM_TBL | DB2-TABLE | 111 | DEFINES THE VALID SYSTEM CODES AND ITS ATTRIBUTES FOR RELATING METRICS DATA WITHIN MIS BUSINESS PROCESS AREAS |
| 1 | D | I_SYS | DECIMAL(4) | 3 | System identifier  Definition below was derived from the ADW Corporate Encyclopedia --  --- A number to uniquely identify a system. |
| | D | N_SYS | CHAR(60) | 60 | The name of a system |
| | D | I_LOGON_RESP_MIS | CHAR(7) | 7 | THE TSO ID OR LOGON ID OF THE MIS PERSON WHO IS RESPONSIBLE FOR A PROJECT.  ------ -- Definition below was derived from the ADW Corporate Encyclopedia -- ----------  ---------- The logon ID of the person who is responsible for a project. |
| | D | C_AREA_MIS_OLD | CHAR(4) | 4 | This field will contain a code which will identify an Old area within the MIS (Management Information System) division of Chrysler. |
| | D | C_AREA_PROC_MIS | CHAR(4) | 4 | THE BUSINESS PROCESS AREA CODE THAT MIS REORGANIZED TO SUPPORT BUSINESS PROCESSES ---  ------------------- -- Definition below was derived from the ADW Corporate Encyclopedia --  -------------------- The business area code that MIS reorganized to support business processes. |
| | | I_SYS_YR_LNCH | DECIMAL(4) | 4 | THE YEAR THAT A SYSTEM LAUNCHED |

60

10/22/1996  10.56.24                          MANAGER SOFTWARE PRODUCTS              PAGE    0005
UPDATE STATUS PREPROD                            DICTIONARY PRODD

| | D | Q_SYS_FNCPT_ADJ | INTEGER | 4 | THE NUMBER OF FUNCTIONS THAT THE SUM OF THE FUNCTIONS FROM ALL OF THE PROJECTS THAT CREATED THE SYSTEM SHOULD BE ADJUSTED TO EQUAL THE TOTAL FUNCTION POINTS FOR THE SYSTEM. |
|---|---|---|---|---|---|
| | D | Q_SYS_FNCPT | INTEGER | 4 | TOTAL FUCNTION POINTS IN THE SYSTEM |
| | D | L_SYS_FNCPT_AUD | CHAR(1) | 1 | A FLAG TO INDICATED IF THE FUNCTION POINTS COUNTS HAVE BEEN AUDITED -- -- Definition below was derived from the ADW Corporate Encyclopedia -- ------- A flag to indicate if the function point counts have been audited. |
| | D | D_SYS_FNCPT_AUD | DATE | 10 | THE DATE THE FUNCTION POINT COUNTS WERE AUDITED. -- Definition below was derived from the ADW Corporate Encyclopedia -- ----- The date the function point counts were audited. |
| | D | Q_FNCPT_TOT_LINE | INTEGER | 4 | TOTAL LINES OF CODE FOR FUCNTION POINTS |
| | D | Q_SYS_FNCPT_TOT | INTEGER | 4 | TOTAL REAL FUCNTION POINTS |
| | D | C_SYS_FNCPT_DEFD | CHAR(1) | 1 | A CODE THAT DEFINES HOW THE FUNCTION POINTS WERE DERIVED OR DEFINED. THE CODE DESCRIBES QTY-SYS-FNCPT Q-SYS-FNCPT |
| | D | C_SYS_LNCD_RCNT | CHAR(1) | 1 | FLAG THAT INDICATES WHETHER THE FUNCTION POINT LINES OF CODE SHOULD BE RECOUNTED. A=ALL, N=COUNT ONLY NEW PGMS |
| | | | IN | | G180.GSYSTEM |

```
DICTIONARY NAMES          DB2 NAMES
----------------          ---------
NMBR-SYS                  I-SYS
NAME-SYS                  N-SYS
NMBR-LOGON-RESP-MIS       I-LOGON-RESP-MIS
CODE-AREA-MIS-OLD         C-AREA-MIS-OLD
CODE-AREA-PROC-MIS        C-AREA-PROC-MIS
NMBR-SYS-YR-LNCH          I-SYS-YR-LNCH
QTY-SYS-FNCPT-ADJ         Q-SYS-FNCPT-ADJ
QTY-SYS-FNCPT             Q-SYS-FNCPT
CNTL-SYS-FNCPT-AUD        L-SYS-FNCPT-AUD
DATE-SYS-FNCPT-AUD        D-SYS-FNCPT-AUD
QTY-SYS-FNCPT-TOT-LINE    Q-FNCPT-TOT-LINE
QTY-SYS-FNCPT-TOT         Q-SYS-FNCPT-TOT
```

61

```
10/22/1996  10.56.24                    MANAGER SOFTWARE PRODUCTS              PAGE      0006
UPDATE STATUS PREPROD                      DICTIONARY PROOD

*  CODE-SYS-FNCPT-DEPD          C-SYS-FNCPT-DEPD                                                                    *
*  CODE-SYS-LNCD-RCNT           C-SYS-LNCD-RCNT                                                                     *
*                                                                                                                   *
*********************************************************************************************************************
```

62

```
10/22/1996  10.56.24                    MANAGER SOFTWARE PRODUCTS              PAGE    0007
UPDATE STATUS PREPROD                       DICTIONARY PRODD
```

```
******************************************************************************************
* DPERSN1-INDEX                                                                           *
*                                                                                         *
*    UNIQUE                                                                               *
*                                                                                         *
*    NMBR-LOGON                    ASCENDING                                              *
*                                                                                         *
******************************************************************************************
* DESCRIPTION OF DPERSN-COPYLIB                                                           *
******************************************************************************************
```

| PKEY | NULL | NAME | TYPE | LENGTH | REMARKS |
|---|---|---|---|---|---|
|  |  | DPERSN_TBL | DB2-TABLE | 142 | THIS IS THE PERSON TABLE A PERSON IS A HUMAN BEING: INDIVIDUAL MAN, WOMAN, OR CHILD. ** SOURCE IS ALSO IN KNOWLEDGEWARE ** OBJECT-TYPE MIS PERSON PRIME-WORD PERSN **** SOURCE IS IN KNOWLEDGEWARE **** *** NON-DICTIONARY SOURCED DB2 TABLE *** |
|  | D | I_LOGON | CHAR(7) | 7 | The system logon-id of an online system user for network access to IMS, CICS, TSO, Info-center, etc. Example: T1234AB. Typically used to denote the person making a change to a record. |
|  | D | N_PERSN_FIRST | CHAR(15) | 15 | First name of a person |
|  | D | N_MID_INIT | CHAR(1) | 1 | MIDDLE INITIAL OF A PERSONS NAME ------------ Definition below was derived from the ADW Corporate Encyclopedia -- ------ The middle initial of a person's middle name. Middle initial of a person's name. The middle initial of a person's middle name. The middle initial of a person's middle name. The first initial of a person's middle name. The middle initial of a person's middle name who wants to purchase a Engineering organization. new vehicle. This may be the same name as the sponsor who requested the agreement. A sponsor is someone who Chrysler considers as an employee or former employee such as a retiree or the retirees surviving spouse. This could also be the name of an eligible person such as a brotherinlaw or sister, etc who is not an employee of Chrysler but is assoicated with an employee. |

63

```
10/22/1996  10.56.24              MANAGER SOFTWARE PRODUCTS              PAGE    0008
UPDATE STATUS PREPROD                 DICTIONARY PRODD
```

| | | | | | |
|---|---|---|---|---|---|
| | D | N_LAST | CHAR(25) | 25 | LAST NAME OF A PERSON. |
| | D | I_PH_AREA_CODE | DECIMAL(3) | 2 | AREA CODE OF PHONE NUMBER ----- Definition below was derived from the ADW Corporate Encyclopedia -- ------ Area code of phone number. Area code of a phone number. |
| | D | I_PH_HOME | CHAR(7) | 7 | THE HOME PHONE NUMBER FOR A PERSON ---- -- Definition below was derived from the ADW Corporate Encyclopedia -- ------ The home phone number for a person. |
| | D | I_PH_WORK | CHAR(7) | 7 | THE WORK PHONE NUMBER FOR A PERSON, OR A BUSINESS. Definition below was derived from the ADW Corporate Encyclopedia -- --- The work phone number for a person. |
| | D | I_CORPLOC | CHAR(4) | 4 | Number that identifies a corporate location as defined by Corporate Procedure 119 |
| | D | I_DEPT | DECIMAL(4) | 3 | A department within Chrysler. A department is unique only when associated with a corporate location. Department number is used throughout Chrysler and is defined by each corporate location. Definition below was derived from the ADW Corporate Encyclopedia -- --- The department number that is being impacted as a result of a copylib A department within a corporate location. A department number is only transfer being issued that represents change. unique when associated with a corporate location. Department number is used throughout Chrysler Corporation and is defined by each corporate location. Normally approved for use by the finance director or comptroller. |
| | D | I_CIMS | CHAR(7) | 7 | THIS GROUP REPRESENTS AN INTER-COMPANY MAILING ADDRESS (CIMS). --- Definition below was derived from the ADW Corporate Encyclopedia -- ------- The inter-company mailing address |

64

| | | | | | |
|---|---|---|---|---|---|
| | | | | | (CIMS). The CIMS code associated with a given department. Employees working in this department will take on this CIMS code. |
| | D | C_EMPL_TYP | CHAR(1) | 1 | AN INDICATOR THAT IDENTIFIES WHETHER AN EMPLOYEE IS PROBATIONARY, PART TIME OR SENIORTIY. EX. 0 - SENIORITY EMPLOYEE, 1 - PROBATIONARY, 2 - TEMPORARY PART TIME. |
| | | | | | ---------------- -- Definition below was derived from the ADW Corporate Encyclopedia |
| | | | | | ---------------- Identifies whether an employee is union, non union, non mis, non chrysler.-An indicator that identifies whether an employee is probationary, part time or seniority. An indicator that identifies whether an employee is probationary, part time or seniority. A code that identifies whether an employee is probationary, part time or seniority. |
| | D | I_PROFS | CHAR(8) | 8 | THIS IS A PROFS ID THAT IS ASSIGNED TO A PERSON. IT CAN ALSO BE USED FOR A CONFERENCE ROOM, DEPARTMENT, OR OTHER THINGS AS ASSIGNED BY THE HOTLINE (OPERATIONS PLANNING AND CONTROL.) |
| | | | | | Definition below was derived from the ADW Corporate Encyclopedia -- |
| | | | | | --- This is a profs id that is assigned to a person. It can also be used for a conference room, department, or other things as assigned by the hotline (Operations Planning and Control). |
| | D | C_RSRCE_TYP | CHAR(5) | 5 | This field will classify a type of resource. |
| | | | | | ---------------- -- Definition below was derived from the ADW Corporate Encyclopedia -- |
| | | | | | Classifies a type of resource as defined by Management Information System. |
| | D | I_SUPVR | CHAR(7) | 7 | Logonid of the supervisor |
| | D | T_STMP_UPD | TIMESTAMP | 26 | Date and time of update DB2 format: YYYY-MM-DD-HH.MM.SS.NNNNNN |
| | D | N_CMPTRPGM | CHAR(8) | 8 | The unique name assigned to a specific computer program |
| | | | | | Definition below was derived from the ADW Corporate Encyclopedia -- |

65

```
10/22/1996  10.56.24                      MANAGER SOFTWARE PRODUCTS              PAGE     0010
UPDATE STATUS PREPROD                         DICTIONARY PRODD

*      *                 *                    *               *    *-----------------------------------------*
    *      *                 *                    *               *    * --- The unique name assigned to a specific *
    *      *                 *                    *               *    * computer program.                        *
    *------*-----------------*--------------------*---------------*----*-----------------------------------------*
    *   D  * I_LOGON_UPD     *                    * CHAR(7)       *  7 *-----------------------------------------*
    *      *                 *                    *               *    * ------------------- Definition below    *
    *      *                 *                    *               *    * was derived from the ADW Corporate      *
    *      *                 *                    *               *    * Encyclopedia -- ----------------------- *
    *      *                 *                    *               *    *                                     The *
    *      *                 *                    *               *    * system logon-id of an online system user for *
    *      *                 *                    *               *    * network access to IMS CICS, TSO, Info-center, *
    *      *                 *                    *               *    * etc. that made the last update.         *
    *------*-----------------*--------------------*---------------*----*-----------------------------------------*
    *   D  * L_PERSN_APRVR_SPCL *                 * CHAR(1)       *  1 * INDICATES WHETHER OR NOT A PERSON CAN APPROVE *
    *      *                 *                    *               *    * SPECIALS SUBMITTED BY APPLICATIONS FOR  *
    *      *                 *                    *               *    * PROCESSING.                             *
    *------*-----------------*--------------------*---------------*----*-----------------------------------------*
    *   D  * L_PERSN_GRNT_APRVR *                 * CHAR(1)       *  1 * INDICATES WHETHER OR NOT A PERSON CAN GRANT *
    *      *                 *                    *               *    * THE ABILITY TO APPROVE SPECIALS TO ANOTHER *
    *      *                 *                    *               *    * PERSON.                                 *
    *------*-----------------*--------------------*---------------*----*-----------------------------------------*
    *                                             * IN            *    * D020.DPERSN                             *
    *************************************************************************************************************
    *
    *  DICTIONARY NAMES          DB2 NAMES
    *  ----------------          ---------
    *  NMBR-LOGON                I-LOGON
    *  NAME-PERSN-FIRST          N-PERSN-FIRST
    *  NAME-PERSN-MID-INIT       N-MID-INIT
    *  NAME-PERSN-LAST           N-LAST
    *  NMBR-PH-AREA-CODE         I-PH-AREA-CODE
    *  NMBR-PH-HOME              I-PH-HOME
    *  NMBR-PH-WORK              I-PH-WORK
    *  NMBR-CORPLOC              I-CORPLOC
    *  NMBR-DEPT-ROOT            I-DEPT
    *  NMBR-CIMS                 I-CIMS
    *  CODE-EMPL-TYP             C-EMPL-TYP
    *  NMBR-PROFS                I-PROFS
    *  CODE-RSRCE-TYP            C-RSRCE-TYP
    *  NMBR-LOGON-SUPVR          I-SUPVR
    *  TIME-STMP-UPD             T-STMP-UPD
    *  NAME-CMPTRPGM             N-CMPTRPGM
    *  NMBR-ACF-LOGON-UPD        I-LOGON-UPD
    *  CNTL-PERSN-APRVR-SPCL     L-PERSN-APRVR-SPCL
    *  CNTL-PERSN-GRNT-APRVR     L-PERSN-GRNT-APRVR
    *
    *************************************************************************************************************
```

66

APPENDIX 3

```
Function prtnrListMoveForward (anElementID As Long, listSize As
Long, listStart As Long, listEnd As Long)
        Dim tl As Integer, t2 As Integer, anIndexID1 As Integer,
anIndexID2 As Integer,
                anElementID1 As Integer, anElementID2 As Integer
        Dim anIndexID As Long
        'ONLY MOVE IF ITS NOT ALREADY AT BEGINNING OF LIST
        If anElementID < > listStart Then
                'FIND FIRST ELEMENT THAT HAS A GREATER SCORE
                prtnrListConvert anElementID, anElementID1, anElementID2
                anIndex ID - Elements (anElementID1, anElementID2) .Previous
                prtnrListConvert anIndexID, anIndexID1, anIndexID2
                Do While (Elements(anElementID1, anElementID2) .Score >
Elements(anIndexID1, an IndexID2) .Score)
                        'CHECK FOR BEGINNING OF LIST
                        If (anIndexID = listStart) Then
                                'DELETE THEN ADD ELEMENT TO BEGINNING OF LIST
                                x - prtnrListDelete(anElementID, listSize,
listStart, listEnd)
                                x - prtnrListAddFromStart(anElementID, listSize,
listStart, listEnd)
                                Exit Function
                        End If
                        anIndexID = Elements(anIndexID1, anIndexID2) .Previous
                        prtnrListConvert anIndexID, anIndexID1, anIndexID2
                Loop
                'CHANGE POINTERS ONLY IF IT HAS MOVED
                If anIndexID < > Elements(anElementID1, anElementID2) .Previous
Then
                x - prtnrListDelete (anElementID, listSize, listStart, listEnd)
                Elements(anElementID1, anElementID2) .Next
        Elements (anIndexID1, anIndexID2) .Next
                prtnrListConvertElements(anIndexID1, anIndexID2) .Next, t1, t2
                Elements(t1, t2) .Previous = anElementID
                Elements(anIndexID1, anIndexID2) .Next = anElementID
                Elements(anElementID1, anElementID2) .Previous = anIndexID
                listSize = listSize + 1
                        End If
        End If
End Function
```

We claim:

1. An apparatus for implementing a predetermined change in a plurality of software objects of a software library, comprising:

a redevelopment database generated from said software library, said redevelopment database having relational information and resource information of said software objects;

a partitioner for creating a plurality of clusters having said plurality of software objects, said partitioner creating said plurality of clusters based upon said relational information;

an assigner for allocating each of said plurality of clusters created by said partitioner to a resource, said assigner allocating each of said plurality of cluster based upon said resource information and producing a plurality of resource allocated modules;

a software change tool for assisting in the implementation of said predetermined change in one of said resource allocated modules, said software change tool producing a changed resource allocated module; and a configuration management system for receiving said changed resource allocated module once said predetermined change has been completed, said configuration management system updating said software library with said changed resource allocated module, whereby said predetermined change in said plurality of software objects of a software library is implemented.

2. The apparatus of claim 1, further comprising a synonym finder, said synonym finder generating an element portfolio from said redevelopment database, said element portfolio limited to said software objects in said software library which potentially require said predetermined change, said element portfolio being provided to said redevelopment database from which a flat file is generated having said relational information used by said partitioner.

3. The apparatus of claim 1 wherein said configuration management system notifies said redevelopment directory of changes to said software library, said redevelopment directory updating said relational information based upon said notification by said configuration management system.

4. The apparatus of claim 1 wherein said software change tool is a text editor.

5. The apparatus of claim 1 wherein said software change tool is a data name finder, said data name finder locating lines of executable code requiring said predetermined change.

6. The apparatus of claim 1 wherein said software change tool is a truncation detector, said truncation detector examining compiler output of said software objects to ensure proper modifications of said software objects with said predetermined change.

7. The apparatus of claim 1 wherein said software change tool is an IMS bridge, said IMS bridge providing a means by which said software objects can store or retrieve data from an IMS database despite said software objects and said IMS database having different formats for said IMS data.

8. The apparatus of claim 1 wherein said assignor is an Access database.

9. The apparatus of claim 1 wherein said predetermined change is said implemented in order to correct problems caused by the year 2000.

10. A method for altering software objects of a management information system, comprising the steps of:

(a) generating a redevelopment database from said management information system, said redevelopment database generated to include relational information and resource information of said software objects;

(b) dividing said software objects into a plurality of clusters based upon said relational information contained in said redevelopment database;

(c) assigning each of said plurality of clusters to a resource based upon said resource information and producing a plurality of resource allocated modules;

(d) altering one of said plurality of resource allocated modules with a predetermined change and producing a changed allocated resource module; and (e) merging said changed allocated resource module into said management information system.

11. The method of claim 10 further comprising the step of generating an element portfolio, said element portfolio generated to have software objects of said management information system which potentially require said predetermined change.

12. The method of claim 10 further comprising the step of updating said redevelopment database when a change is made to the management information system.

13. The method of claim 10 further comprising the step of locating lines of executable code requiring said predetermined change using a data name finder.

14. The method of claim 10 further comprising the step of examining compiler output with a truncation detector in order to ensure proper modifications of said software objects with said predetermined change.

15. The method of claim 10 further comprising the step of bridging IMS data in order to allow said IMS data to be used by software objects having a different format specified for said IMS data than is specified in an IMS database holding said IMS data.

16. The method of claim 10 further comprising the step of notifying said redevelopment database that a change has been made to said management information system.

17. The method of claim 16 further comprising the step of updating said redevelopment database upon receiving said notification that said change has been made to said management information system.

18. The method of claim 10 further comprising the step of conducting day-to-day modifications in addition to said predetermined change.

19. The method of claim 10 wherein altering said software objects is performed in order to correct problems caused by the year 2000.

* * * * *